United States Patent [19]

Eickmann

[11] 4,452,411
[45] Jun. 5, 1984

[54] DEVICES WHICH MAY BE BORNE IN AIR AND IN DEVICES APPLICABLE THEREIN

[76] Inventor: Karl Eickmann, 2420 Isshiki, Hayama-machi, Kanagawa-ken, Japan

[21] Appl. No.: 308,202

[22] Filed: Oct. 2, 1981

[51] Int. Cl.³ .................... B64C 3/56; B64C 3/38
[52] U.S. Cl. .................... 244/49; 244/12.4; 244/48; 244/207
[58] Field of Search .................... 244/DIG. 3, 6, 7 R, 244/7 C, 8, 12.4, 17.11, 17.13, 17.15, 206, 45 R, 46, 65, 208

[56] References Cited

U.S. PATENT DOCUMENTS

| | | | |
|---|---|---|---|
| 1,891,166 | 12/1932 | Leupold | 244/7 C |
| 1,939,156 | 12/1933 | Wright | 244/DIG. 3 |
| 2,212,490 | 8/1940 | Alder, Jr. | 244/DIG. 3 |
| 2,454,138 | 11/1948 | Delzer | 244/DIG. 3 |
| 2,743,072 | 4/1956 | Emmi | 244/6 |
| 2,941,605 | 6/1960 | Sikorsky | 244/17.13 X |
| 3,119,577 | 1/1964 | Andrews | 244/7 R |
| 3,184,181 | 5/1965 | Kaplan | 244/7 C |
| 3,197,157 | 7/1965 | King | 244/7 C |
| 3,241,791 | 3/1966 | Piasecki | 244/6 |
| 3,410,506 | 11/1968 | Hayes | 244/7 R |
| 3,606,571 | 9/1971 | Wood | 244/7 R |
| 3,794,273 | 2/1974 | Girard | 244/8 |
| 4,136,845 | 1/1979 | Eickmann | 244/12.4 |
| 4,142,697 | 3/1979 | Fradenburgh | 244/7 R |

FOREIGN PATENT DOCUMENTS 507343  5/1954  Belgium ............................. 244/7 C

*Primary Examiner*—Trygve M. Blix
*Assistant Examiner*—Rodney Corl

[57] ABSTRACT

A rotor having airfoil-section shaped blades is set into a fluid stream. Over a connection-or-transmission means a propeller is connected to the rotor. The fluid stream whereinto the rotor is set gives airflow energy to the rotor and revolves the rotor. The propeller is driven by the rotor over the connection-or transmission means. Since the propeller is revolved by the rotor in the fluid stream, the propeller provides a thrust. The thrust may be used to lift a weight or to drive a member. A suitable application of the arrangement is for example, to transform a multi-bladed helicopter into a gliding craft which descends under a gliding angle towards the surface of the earth, when the helicopter has a complete engine failure. Auto-rotation accidents can thereby become prevented. The device is also applicable to drive a vehicle or to lift a weight. Variable means can be applied to obtain variable thrusts in flying craft to improve their efficiencies or change from one flight-system to another flight system. In other embodiments several novel concepts for air-borne craft are provided which include emergency landing devices, retractable and extendable or relation-varifying devices for wings or propellers. Improvements are also proposed to engines and hydraulic devices to increase the power or efficiency, the lessen the weight per power output or to simplify the manufacturing and reduce the costs.

10 Claims, 56 Drawing Figures

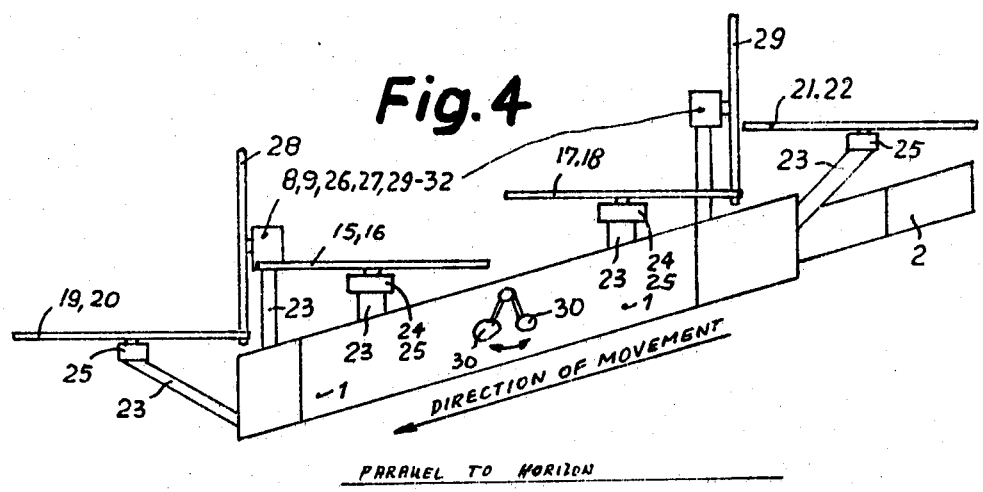
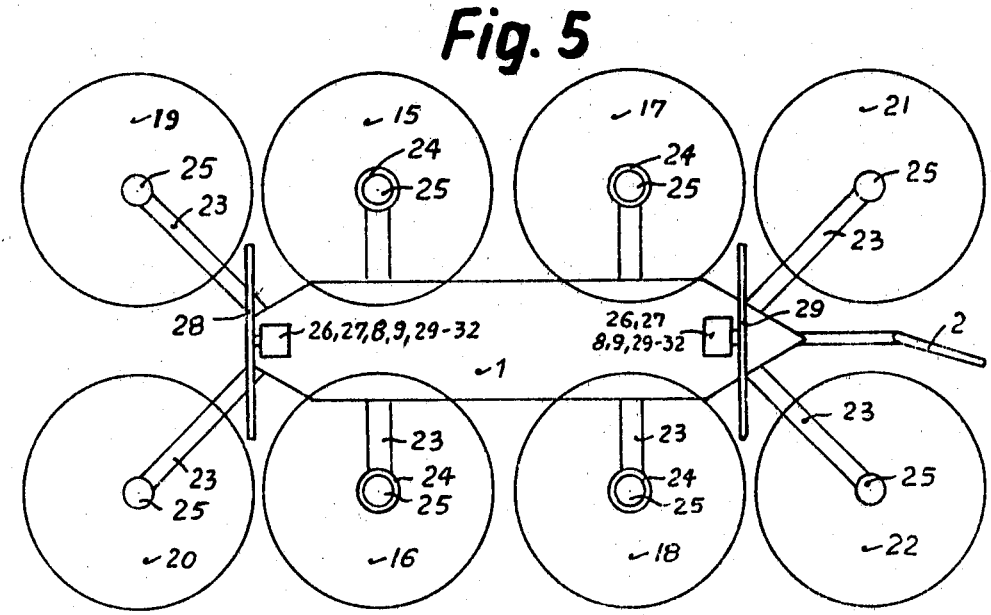

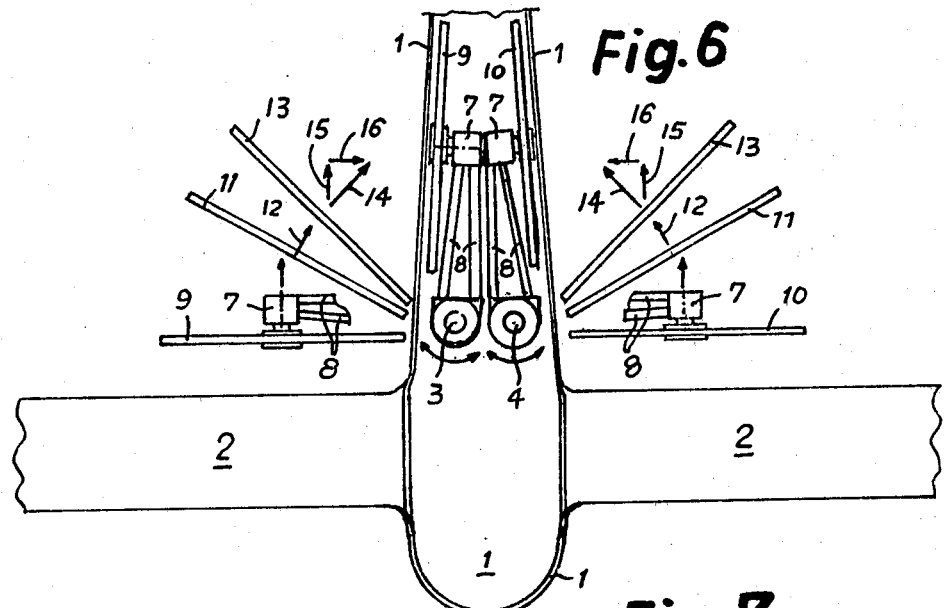
Fig. 6
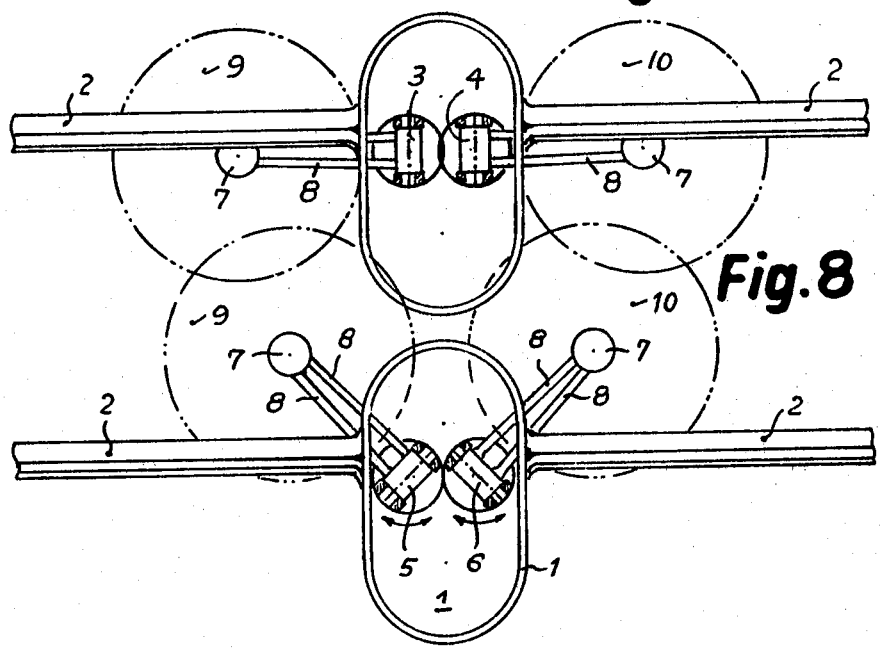
Fig. 7
Fig. 8

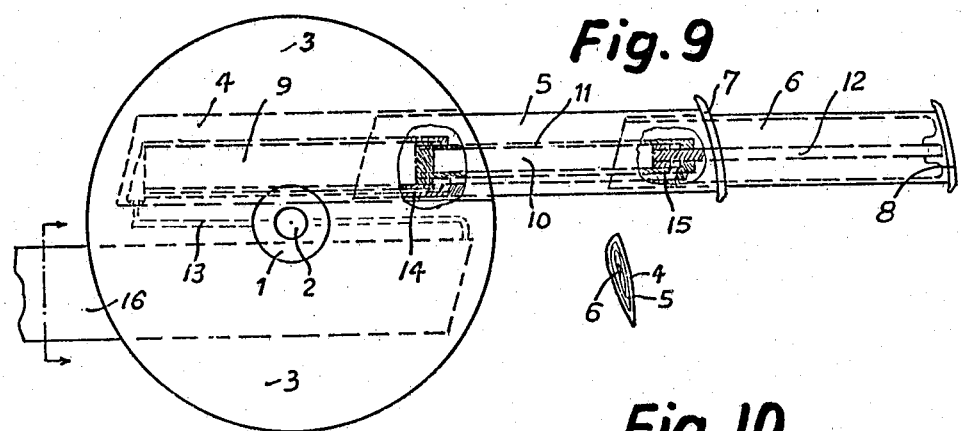
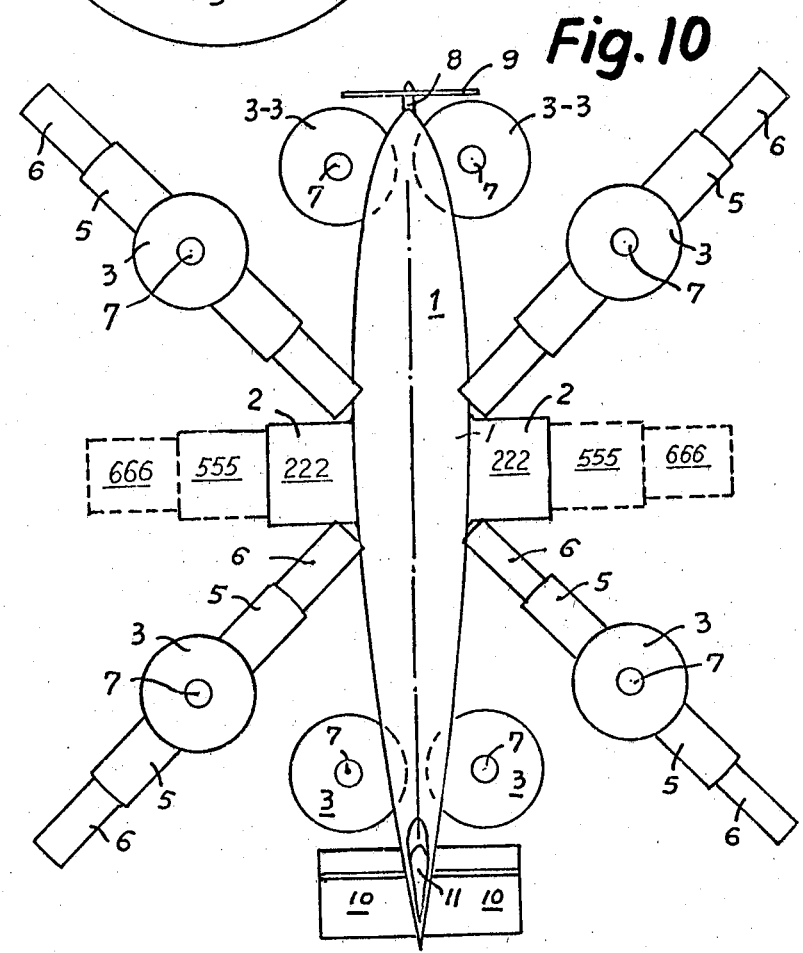

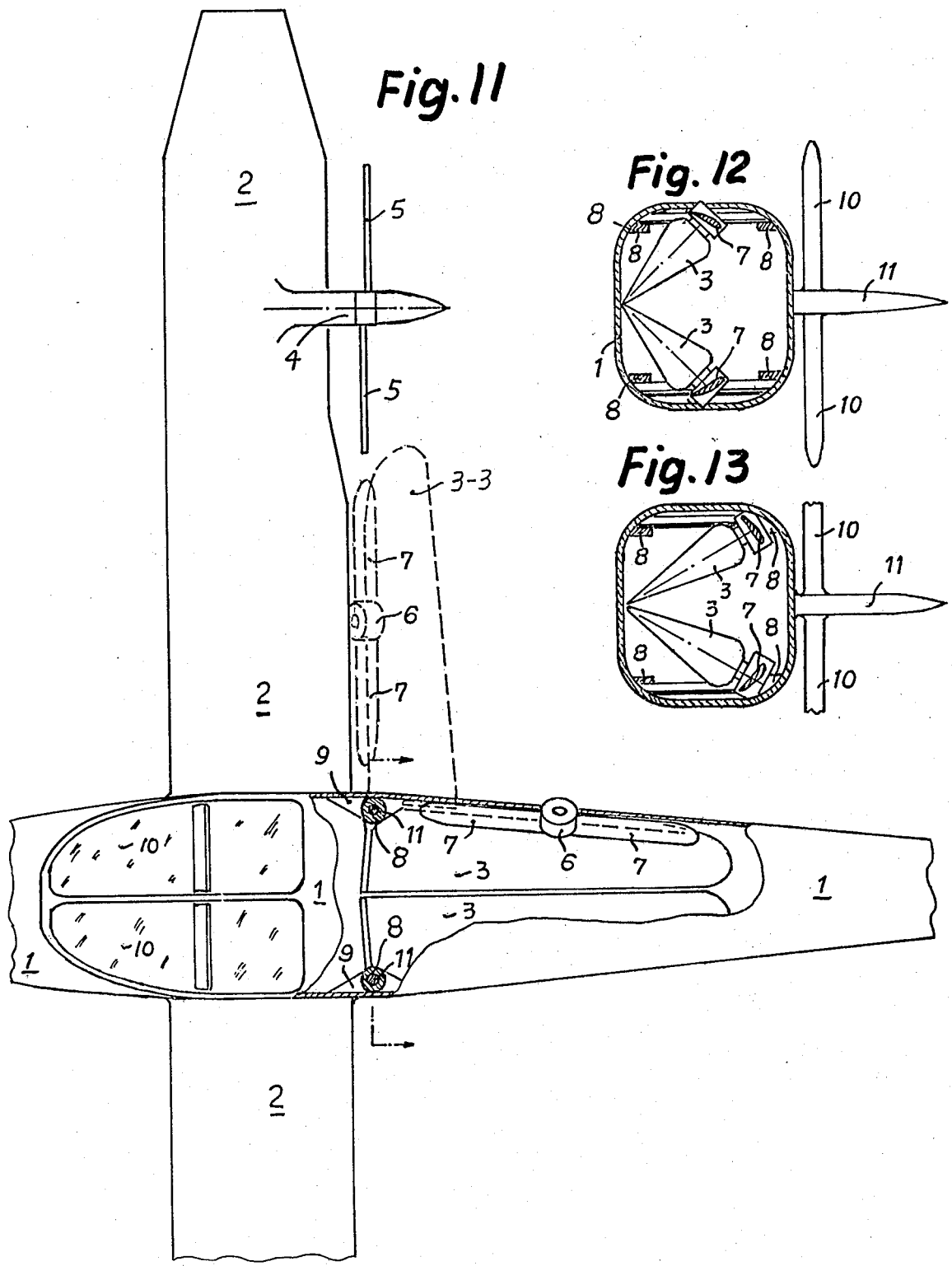

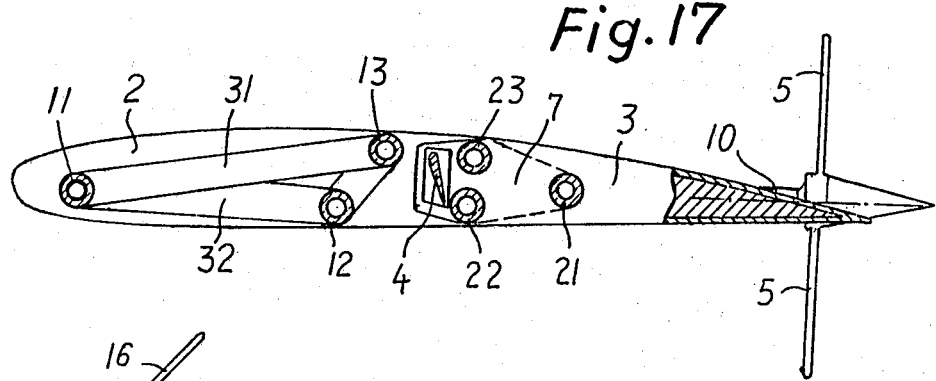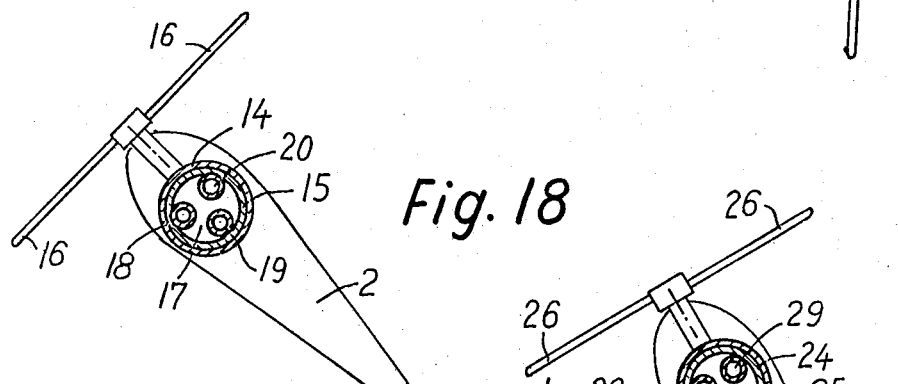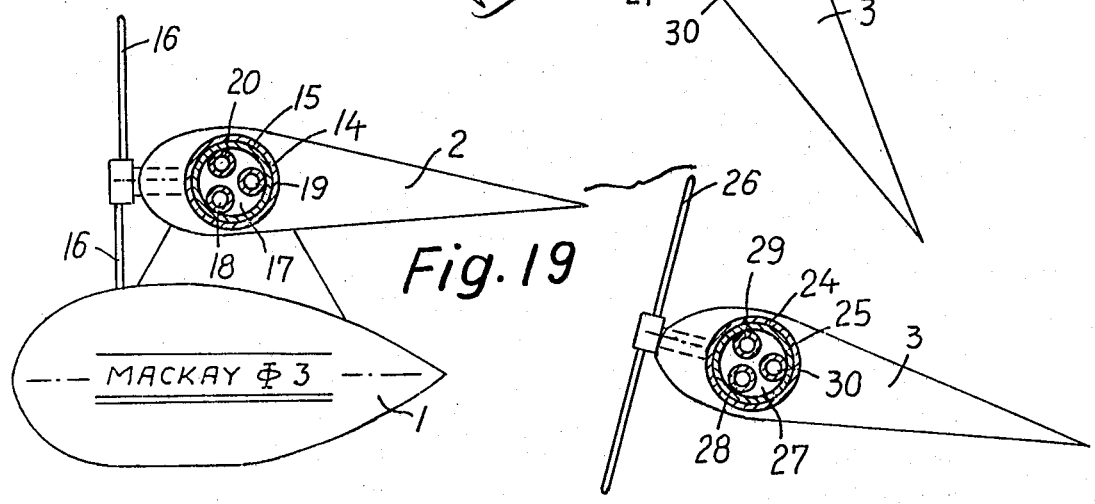

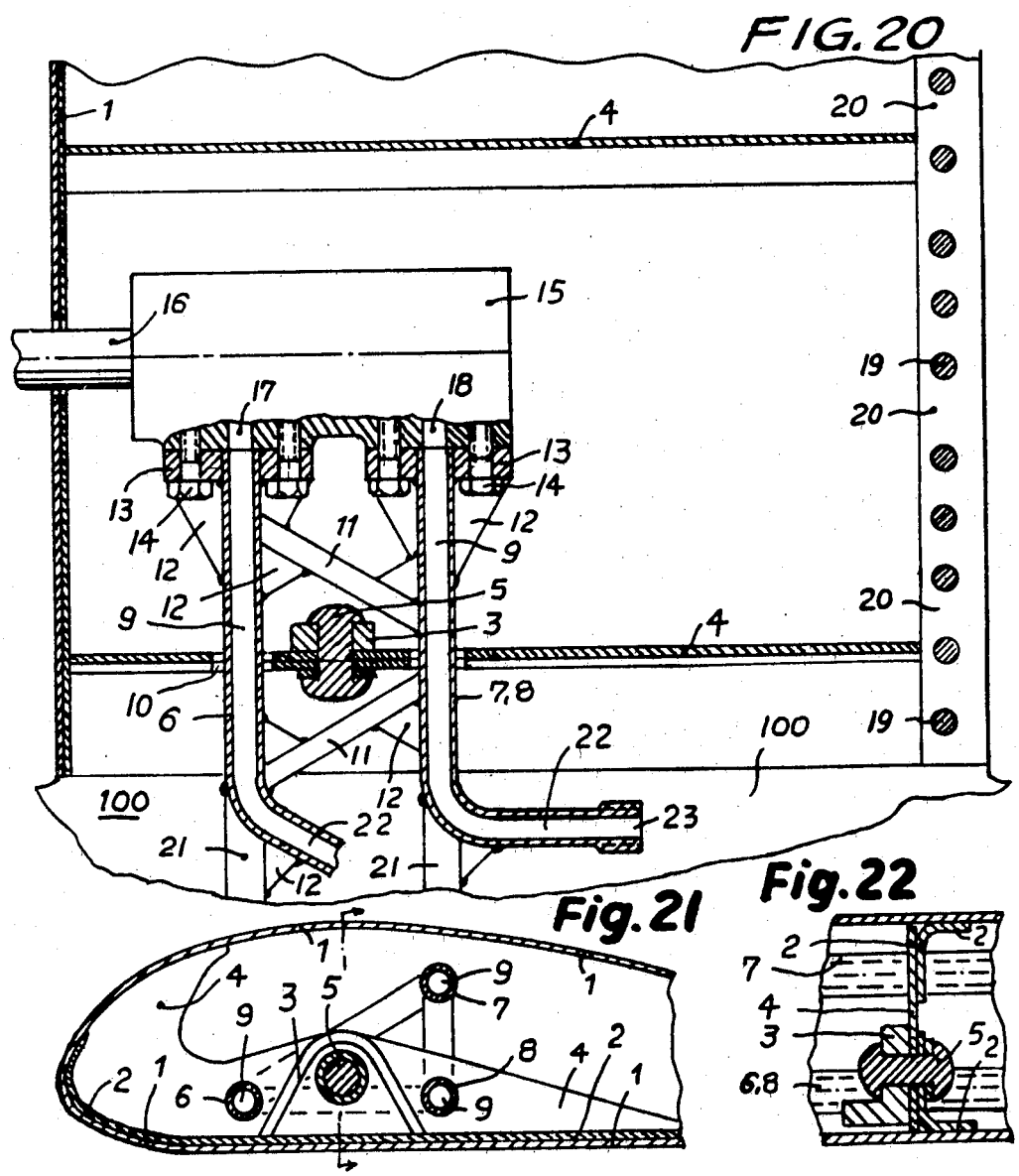

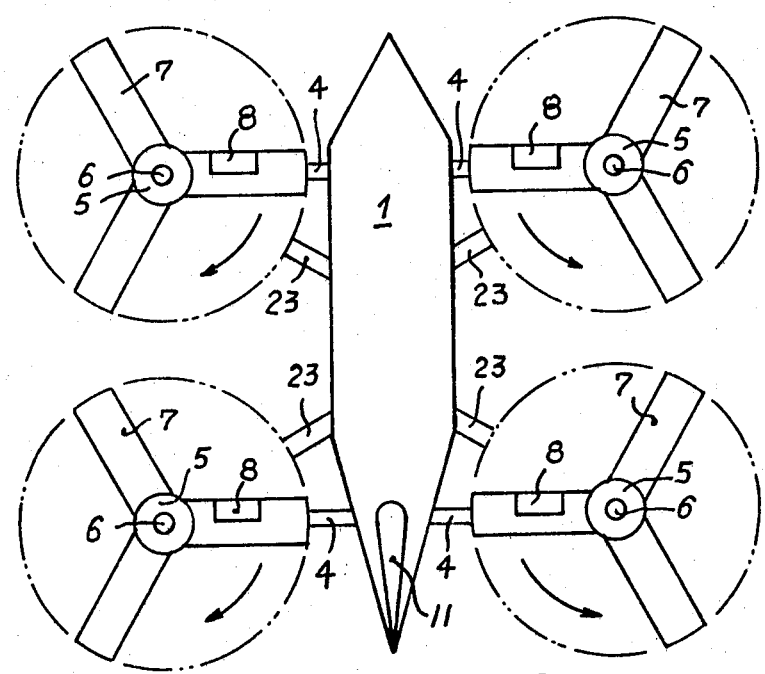
Fig. 28
Fig. 29
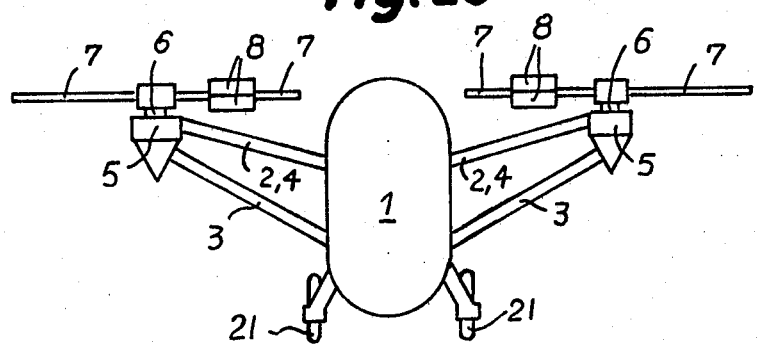

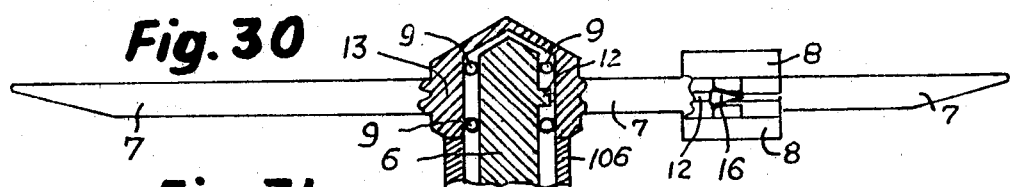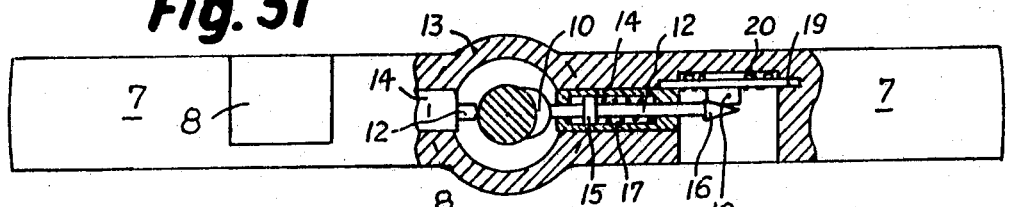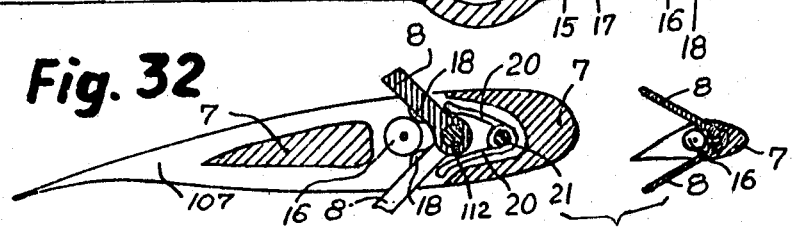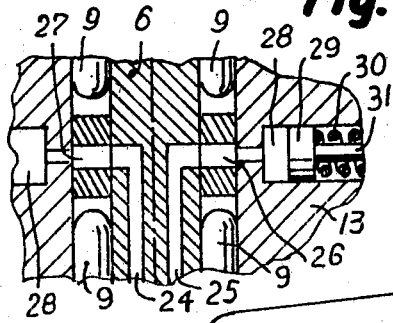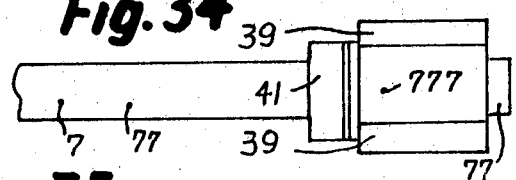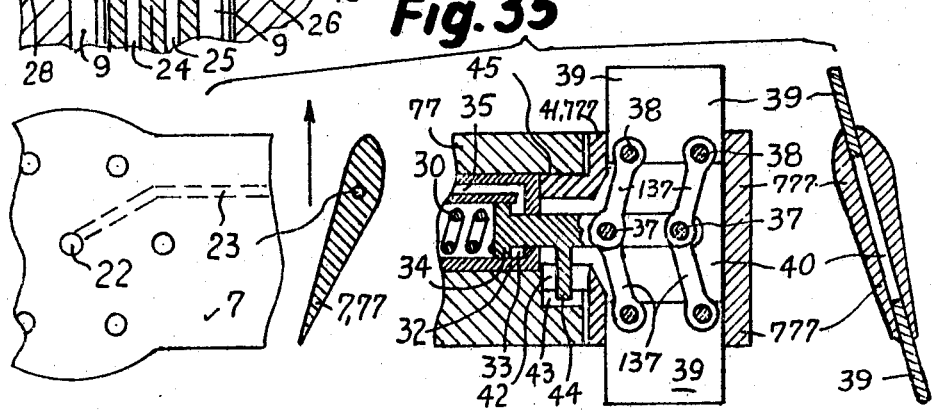

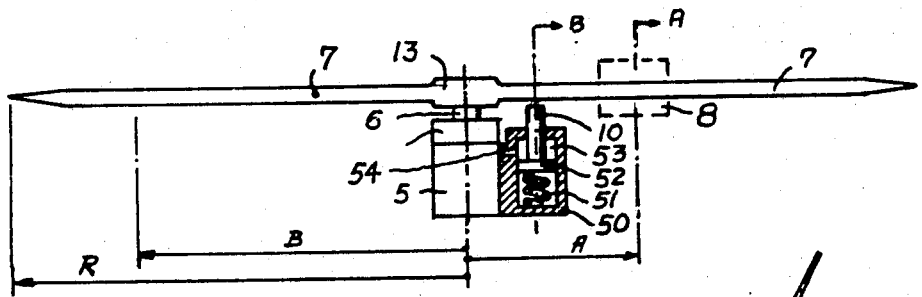
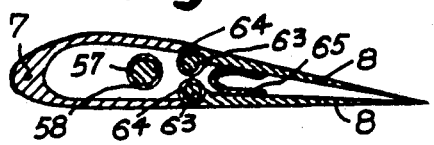
Fig. 37  Fig. 38
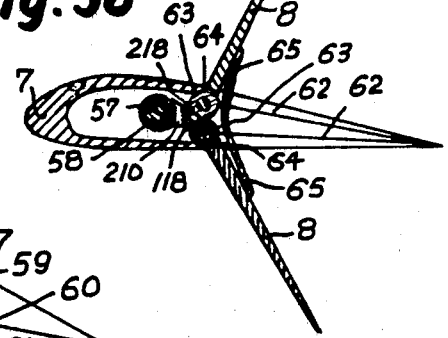
Fig. 39
Fig. 40
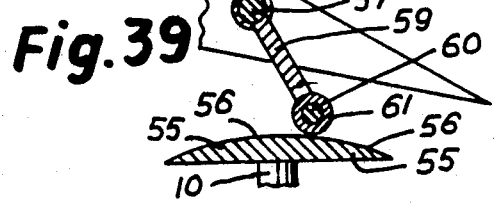
$W = \text{DRAG} = (\rho/2) F C_W V_P^2$    with $F$ = Area of blade.
   $V_P$ = Velocity of "F" to AIR
$B \approx 0.75 R$    $F_B \approx 0.5 F_{BLADE}$    $C_W$ = Coefficient of DRAG
$W_{Left} = W_{Right}$:
$(\rho/2) F_L C_{WL} V_L^2 = (\rho/2) F_R C_{WR} V_R^2$
$(\rho/2) F_L C_{WL} (2B\pi n/60)^2 = (\rho/2) F_R C_{WR} (2A\pi n/60)^2$
$F_L C_{WL} B^2 = F_R C_{WR} A^2$
$A = \sqrt{(F_L C_{WL}/F_R C_{WR}) B^2 / \eta}$

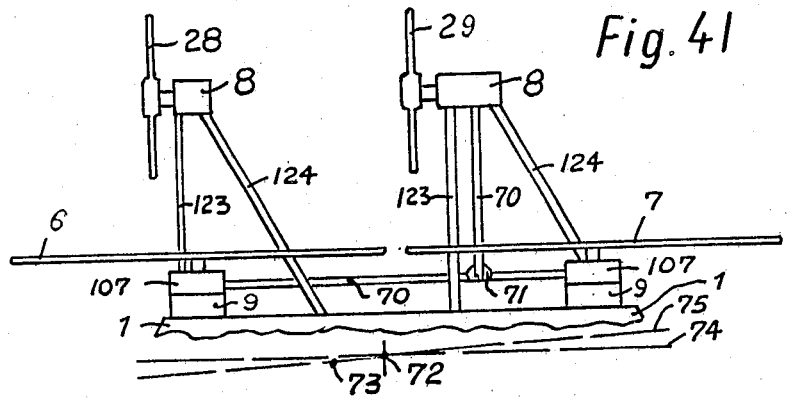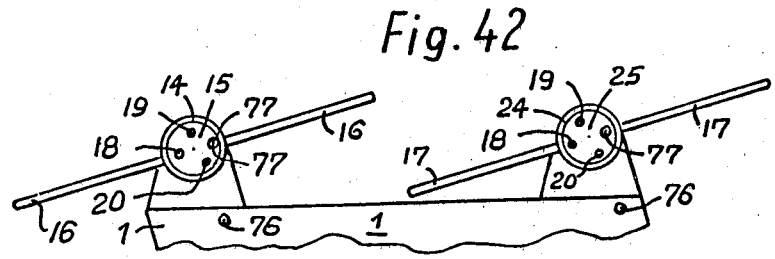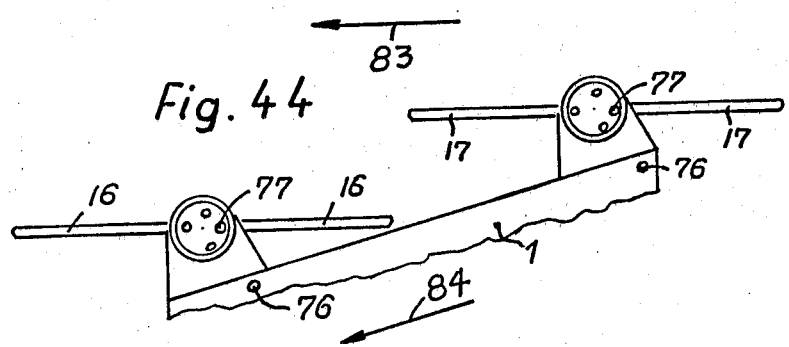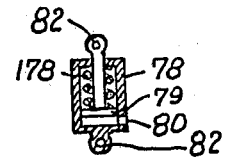

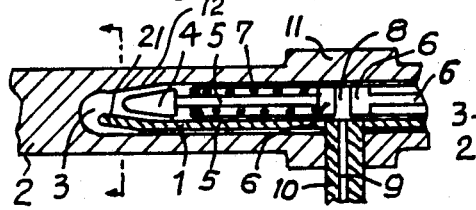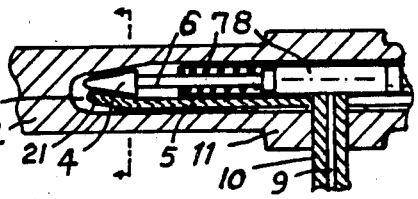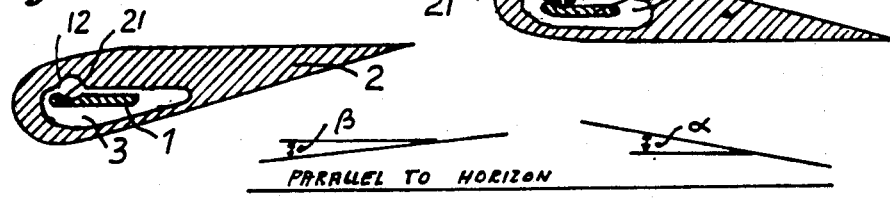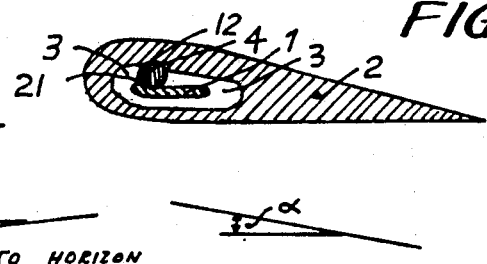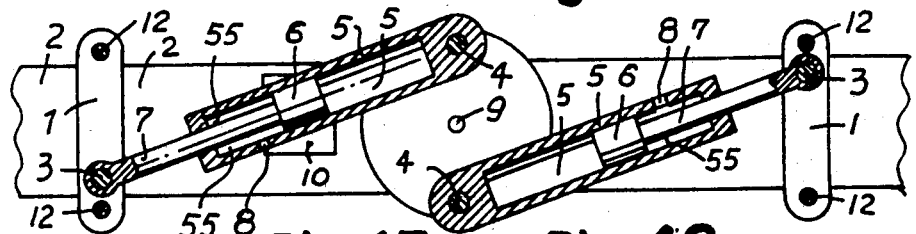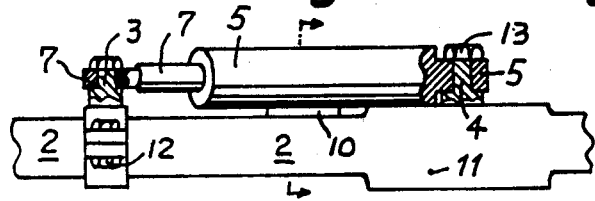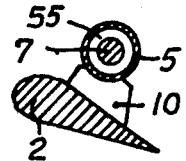

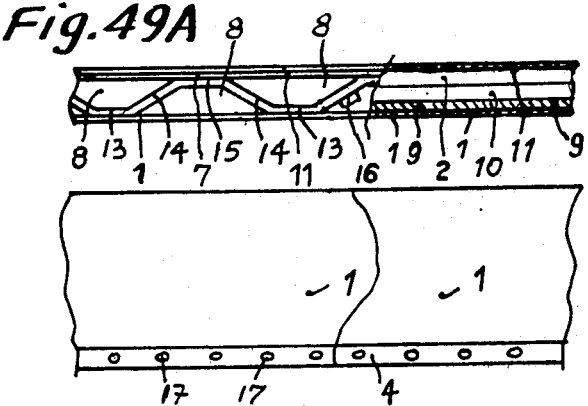
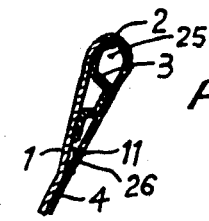
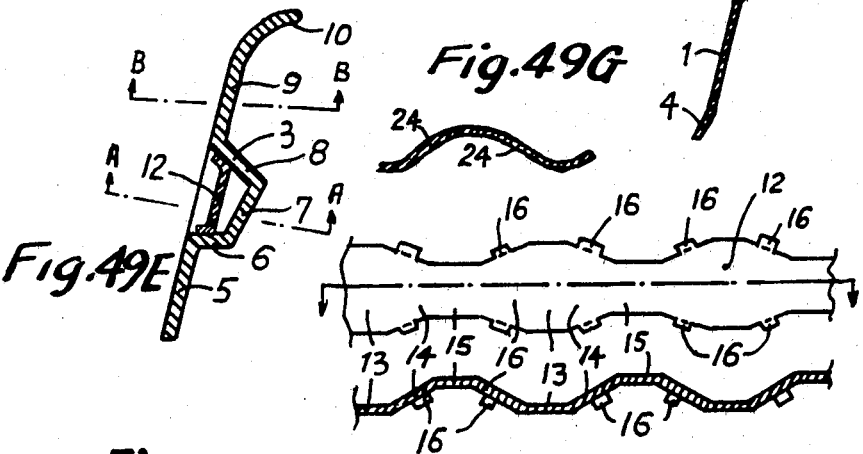
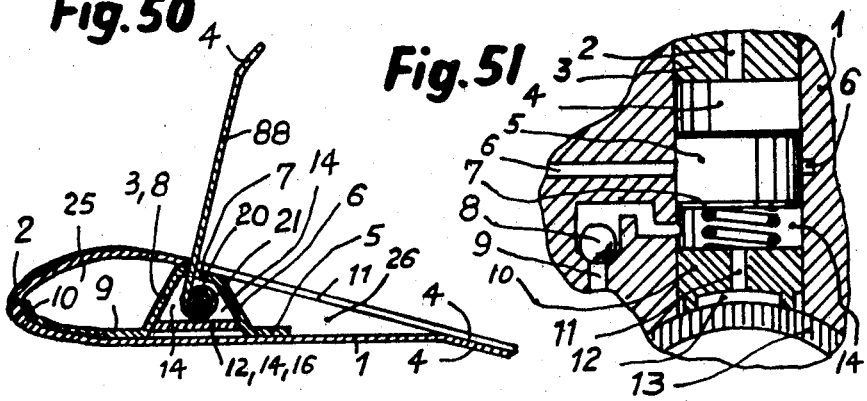

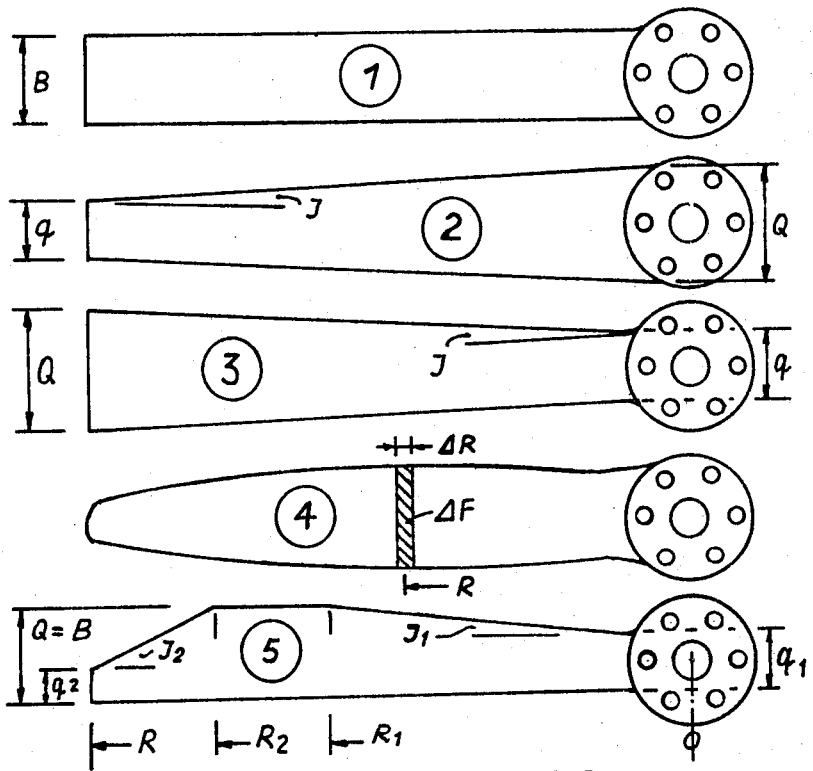

Fig. 52

| TYPE | CALCULATION BY: |
|---|---|
| 1 | $W = MBR^3$ or: $MB(R_2^3 - R_1^3)$ <br> $Md = SBR^4$ or: $MB(R_2^4 - R_1^4)$ |
| 2 | $W = [QM(R_2^3 - R_1^3) - JS(R_2^4 - R_1^4)]$ <br> $Md = [QS(R_2^4 - R_1^4) - JT(R_2^5 - R_1^5)]$ |
| 3 | $W = [qM(R_2^3 - R_1^3) + JS(R_2^4 - R_1^4)]$ <br> $Md = [qS(R_2^4 - R_1^4) + JT(R_2^5 - R_1^5)]$ |
| 4 | $W = $ SUM OF $E(½) \Delta F (R_2^2 - R_1^2)$ <br> $Md = $ SUM OF $E(⅓) \Delta F (R_2^3 - R_1^3)$ } STEPWISE CALCULATION |
| 5 | $W = [qM(R_1^3 - 0) + JS(R_1^4 - 0)] + BM(R_2^3 - R_1^3) + [Q'M(R^3 - R_2^3) - J_2 S(R^4 - R_2^4)]$ <br> $Md = [qS(R_1^4 - 0) + JT(R_1^5 - 0)] + BS(R_2^4 - R_1^4) + [QS(R^4 - R_2^4) - J_2 T(R^5 - R_2^5)]$ |

$N = Md\omega$ $W = $ RESISTANCE
$Md = $ TORQUE
$N = $ POWER
$E = (9/2) \mathcal{C} \omega \omega^2$
$M = (⅓) E$
$S = (¼) E$; $\bar{R} = Md/W$
$T = (⅕) E$; $N = \bar{R} W \omega$

Fig. 53

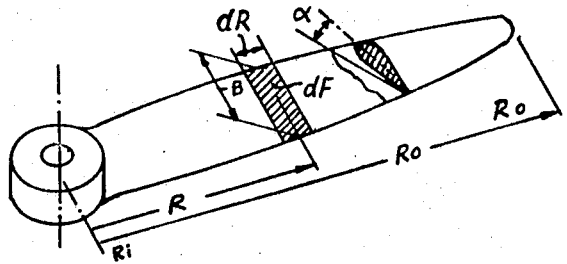

$\omega$ = angular velocity = $1/s$    $n$ = Rpm
$\omega = \pi n/30$;   $\pi = 3.14...$
$S$ = density of air; f.e. $0.125$ $Kgs^2/m^4$ near sea level.
$Ca$ = Coefficient of Lift           $Md$ = Moment = TORQUE
$Cw$ = Coefficient of resistance     Lift = $W(ca/cw)$
$W$ = RESISTANCE                     $L$ = Lift
$N$ = POWER REQUIRED                 $\overline{(\ )}$ = Integral mean values
$K$ = Konstant = $(S/2)Cw$           $F$ = AREA
$W = (S/2)Cw\,F\,V^2 = KFV^2$        $L = (S/2)Fca\,V^2 = W(ca/cw)$
$V = 2R\pi n/60 = m/s =$             $V = R\omega$
$E = K\omega^2$    $M = (1/3)E$    $S = (1/4)E$    $T = (1/5)E$

DEVELOPMENT OF THE FORMULAS:

$dV = \omega dR$;   $V = \int \omega dR$   $V = \omega R$   $\overline{V} = \int \omega dR/\Delta R = 1/2\,\omega R^2$ $dW = K\omega^2 dF R^2 = ER^2 dF = ER^2 dB dR$ $W = \int dW = \int ER^2 \overline{B} dR = E\overline{B} \int R^2 dR = E\overline{B}(1/3)(R_2^3 - R_1^3)$ if B is constant, as in TYPE ①

$dMd = K\omega^2 R^3 dF = ER^3 dF = ER^3 dB dR$ $Md = \int dMd = \int ER^3 \overline{B} dR = E\overline{B} \int R^3 dR = E\overline{B}(1/4)(R_2^4 - R_1^4)$ if B is constant For B linear inclined:  ⟨────⟩  $J$: $J$ introduced. $J = (\frac{\Delta Q}{\Delta R})$ TYPE ③:  $W = E(q + JR) R^2 dR = Eq\,1/3 R^3 + EJ\,1/4 R^4$
         $Md = E(q + JR) R^3 dR = Eq\,1/4 R^4 + EJ\,1/5 R^5$
TYPE ②:  $W = E(Q - JR) R^2 dR = EQ\,1/3 R^3 - EJ\,1/4 R^4$
         $Md = E(Q - JR) R^3 dR = EQ\,1/4 R^4 - EJ\,1/5 R^5$
         OR:
TYPE ③:  $W = Mq(R_2^3 - R_1^3) + SJ(R_2^4 - R_1^4)$
         $Md = Sq(R_2^4 - R_1^4) + TJ(R_2^5 - R_1^5)$ TYPE ②:  $W = MQ(R_2^3 - R_1^3) - SJ(R_2^4 - R_1^4)$
         $Md = SQ(R_2^4 - R_1^4) - TJ(R_2^5 - R_1^5)$ TYPE ⑤:  CALCULATE INNER- MEDIAL- AND OUTER-PORTIONS BY ABOVE EQUATIONS.
         FOR OUTER PORTION USE $Q'$ INSTEAD OF $Q$.    $Q' = q_2 + J_2 R$   ($R = R_o$ above)

DEVICES WHICH MAY BE BORNE IN AIR AND IN DEVICES APPLICABLE THEREIN

BACKGROUND OF THE INVENTION

1. Field of the Invention

This invention relates to flying or floating craft and to devices which utilize a flowing fluid or movement of a body in fluid to create a rotation and/or lift or thrust.

2. Description of the Prior Art

Helicopters were commonly provided with an auto-rotation arrangement. However the descending speed of the helicopter in auto-rotation is rather high. The "descent-speed slow down" maneuver is a delicate proceedure which often fails and the helicopters crash. The trend of development of helicopters is presently to reduce the weights. Also the weights of the rotors becomes reduced. That reduces as a side effect the time of the landing maneuver in auto-rotation and thereby increases the chance of failure of the landing maneuver, whereby the likeliness of a crash increases, when the engine of the helicopter fails.

In motor powered gliders is was custom in the former art to swing a motordriven propeller into and out of the craft, when a change over from motorless gliding to powered gliding and vice versa was desired. The swing out of the propeller resulted in a negative influence of the flight path of the glider. The sudden appearance and disappearance of the drag of the propeller brought a negative influence on the speed and stability of the glider in the surrounding air.

SUMMARY OF THE INVENTION

It is the main object to overcome the problems and difficulties of the described former art and in addition to provide a fluid-flow responsive thrust—and/or rotation providing device.

Another object of the invention is, to provide to a helicopter a capability to glide similar to a glider down to the earth under an angle of inclination relatively to the ground when the power plant of the helicopter fails.

More objects of the invention are, for example; to provide:

1. A device which may be capable of travel in air, for example, a helicopter or an aircraft, or devices which may be applied therein or in other vehicles or machines,
   wherein an improvement is provided, which provides an improved efficiency or power to the device, decreases its weight per power or simplifies the manufacturing thereof;
2. The device of 1,
   wherein a fluid-stream responsive thrust arrangement is provided, which may be a fluid flow responsive propeller containing thrust providing unit or a resistance body extendable and retractable provided to an arm of a propeller;
3. The device of 1,
   wherein an arrangement is provided to maintain automatically an angle of autorotation of a propeller blade as long as the blade is in its natural shape, while the arrangement includes a fluid pressure responsive control arrangement which increases automatically the pitch of the propeller blade, when a power plant drives a fluid pump and supplies pressure to the said control arrangement in order to have a propeller pitch of helicopter flight performance when the power plant operates with the respective power and to have the angle of attack of the propeller blade automatically returned to its natural angle of auto-rotation or of gyrocopter performance, when the power plant or fluid supply fails, in flight or when the power plant is turned off;
4. The device of 1,
   wherein an arrangement is provided which automatically changes a helicopter into a glider borne on revolving propellers, when the power plant(s) respectively fails (fail);
5. The device of 1,
   wherein means are provided to retract a wing-portion, propeller, revolving disc or any other suitabe arrangement entirely or partially into the body of the craft or into a medial propeller blade holder in response to or command or in automatic response to a respective pressure in fluid in a fluid flow supply arrangement;
6. The device of 1,
   wherein second wing portions are provided relatively to first wing portions, while said first and second wing portions or one or more thereof are provided with means to change their location or angular relationship relatively to the other of said first and second wing portions;
7. The device of 1,
   wherein a wing is provided which is constructed by the arrangements of FIGS. 20 to 22 or of FIGS. 23 to 27, or of FIG. 49 or FIG. 50;
8. The device of 1,
   wherein the equations and/or diagrams of FIGS. 52 to 56 or of FIG. 40 are utilized to improve the performance of an airborne craft or the behaviour of such craft;
9. An aircraft having a body with a longitudinal imaginary vertical medial plane through said body and a pair of first wing portions extending laterally from said body, one wing of said pair in one lateral direction of said plane and the other wing of said pair extending symmetrically in the opposite direction of said plane,
   wherein said wings of said pair include fluid lines to a pair of fluid motors which revolve propellers which are fastened to the rotors of said motors,
   wherein a second pair of secondary wings is provided in said craft, while one wing of said pair of secondary wings extends laterally of said medial plane and the other wing of said secondary wings extends from said body symmetrically in the opposite direction of said plane,
   wherein said secondary pair of wings includes fluid lines to secondary fluid motors which revolve secondary propellers which are fastened to the rotors of the motors of said secondary wing pair,
   wherein flexible means are included in said fluid lines,
   wherein said secondary wing pair includes flexibility arrangements to permit a change of the location or direction of said wings to said secondary pair, and
   wherein said secondary wings are variable in their position relatively to said first wing pair in order to obtain suitable flight conditions of said craft at different speeds of forward movement of said craft.

More objects of the invention and features obtained by one or more embodiments of the invention will become apparent from the description of the preferred embodiments of the invention.

FIG. 4 shows an aircraft of the invention seen from the side.

FIG. 5 is a view to the craft of FIG. 4 from above.

FIG. 6 shows an aircraft of the invention seen from above.

FIG. 7 shows the craft of FIG. 6 from the front.

FIG. 8 shows the craft of FIG. 6 from the front in a modified condition.

FIG. 9 shows a portion of a propeller of the invention from above.

FIG. 10 shows an aircraft of the invention set forth above.

FIG. 11 shows another aircraft of the invention seen from above.

FIG. 12 is a sectional view through FIG. 11 along arrowed line thereof.

FIG. 13 is a sectional view as in FIG. 12, however with modified parts.

FIG. 17 is a view as in FIG. 14, however with a modification of a portion.

FIG. 18 is a sectional, longitudinal view through wing portions.

FIG. 19 is a view as in FIG. 18, however with a modification.

FIG. 20 is a sectionally horizontal view through an aircraft wing.

FIG. 21 is a longitudinal sectional view through the wing of FIG. 20.

FIG. 22 is a sectional view through FIG. 21 along the arrowed line therein.

FIG. 28 shows an aircraft of the invention seen from above.

FIG. 29 shows the craft of FIG. 29 seen from the front of it.

FIG. 30 is a longitudinal sectional view through a propeller, partially seen from the rear of it.

FIG. 31 shows a propeller of FIG. 30 partially from above, partially by a horizontally laid sectional view.

FIG. 32 is a cross-sectional view through FIG. 30 along the arrowed line.

FIG. 33 is a longitudinal sectional view through a medial propeller portion.

FIG. 34 shows a propeller portion seen from the rear.

FIG. 35 shows sectional views through a propeller portion.

FIG. 36 shows a propeller seen from the rear and a portion in section.

FIG. 37 shows a cross-sectional view through FIG. 36 along arrowed line A.

FIG. 38 shows a view as in FIG. 37, however with a modification.

FIG. 39 shows a cross-sectional view through FIG. 36 along arrowed line B.

FIG. 40 shows a mathematical evaluation and analysis.

FIG. 41 shows a vehicle seen from the side.

FIG. 42 shows the vehicle as in FIG. 41, however with a modification.

FIG. 43 shows a longitudinal sectional view through a controller.

FIG. 44 shows the vehicle of FIG. 41 by a portion thereof and modified.

FIG. 45 shows sectional views through a propeller portion.

FIG. 46 shows sectional views through an arrangement to a propeller.

FIG. 47 demonstrates details of FIG. 46.

FIG. 48 is a cross-sectional view through FIG. 47 along the arrowed line.

FIG. 49 shows sectional views through a wing or propeller.

FIG. 50 shows a modification of FIG. 49.

FIG. 51 is a longitudinal sectional view through an automatic controller.

FIG. 52 demonstrates a mathematical analysis with formulas.

FIG. 53 demonstrates how the formulas of FIG. 52 were developed.

Figure 54:
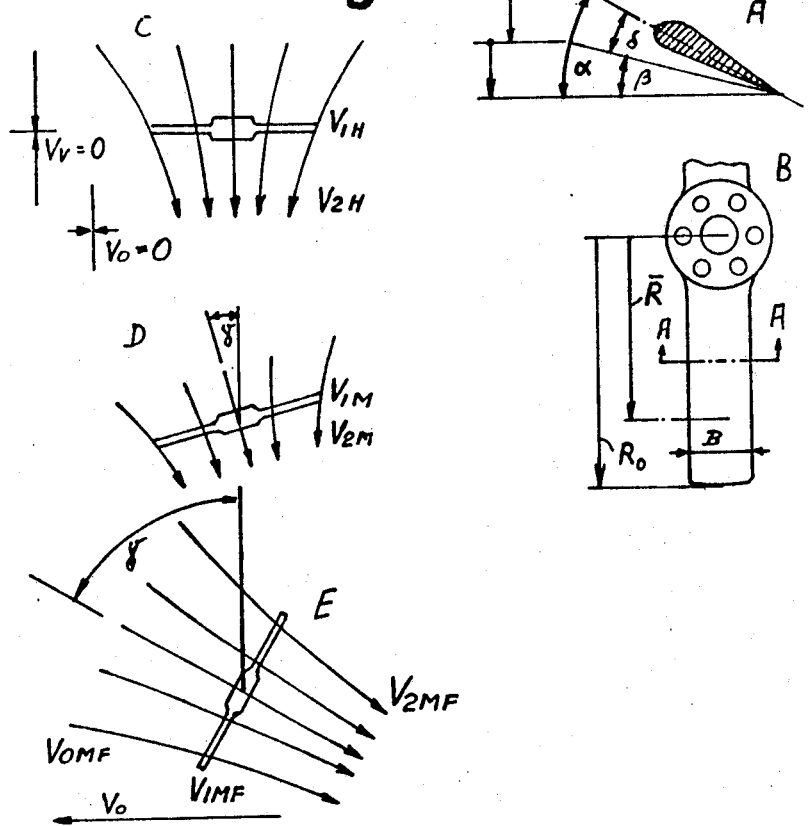

FIG. 54 demonstrates an analysis related to propellers.

Figure 55:
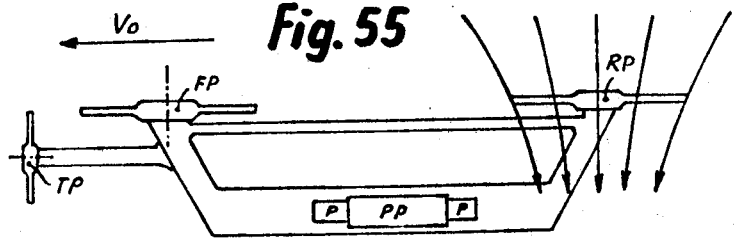

FIG. 55 demonstrates the influence thereof to a vehicle.

Figure 56:
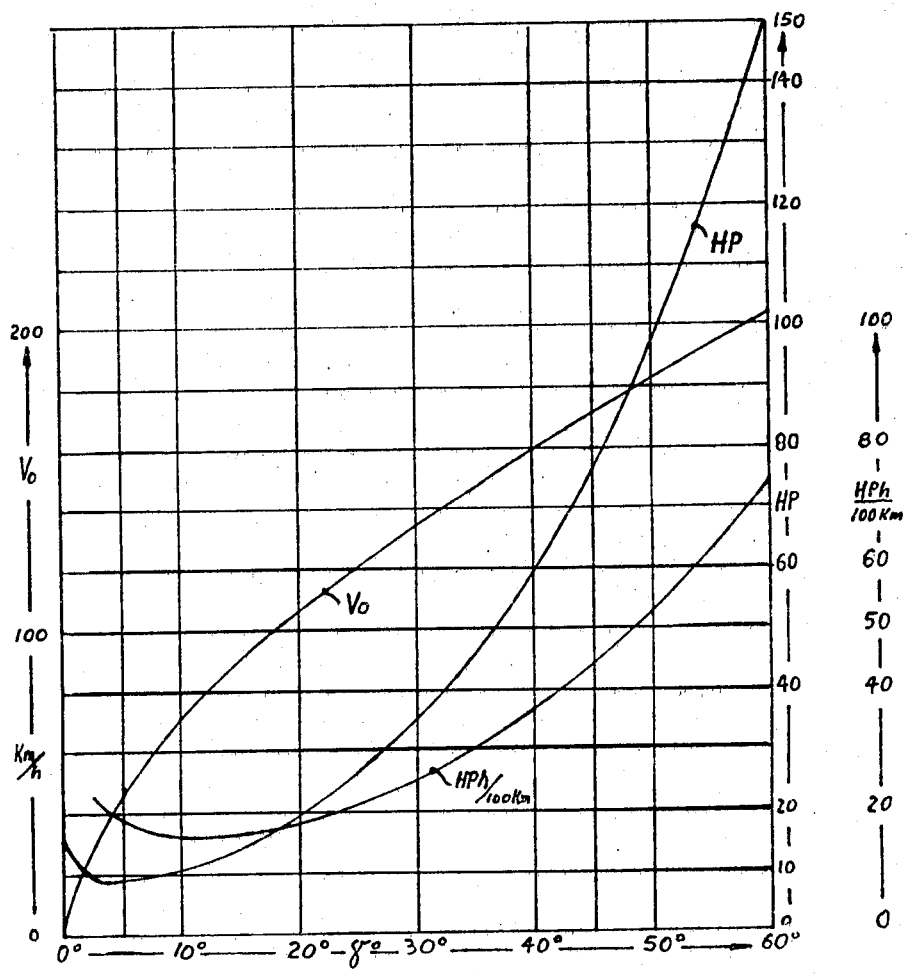

FIG. 56 shows a diagram in relation to FIG. 55.

All figures are demonstrating embodiments of the invention, schematic explanations or mathematical analyses of the respective embodiments of the invention.

DESCRIPTION OF THE PREFERRED EMBODIMENTS

Figure 1:
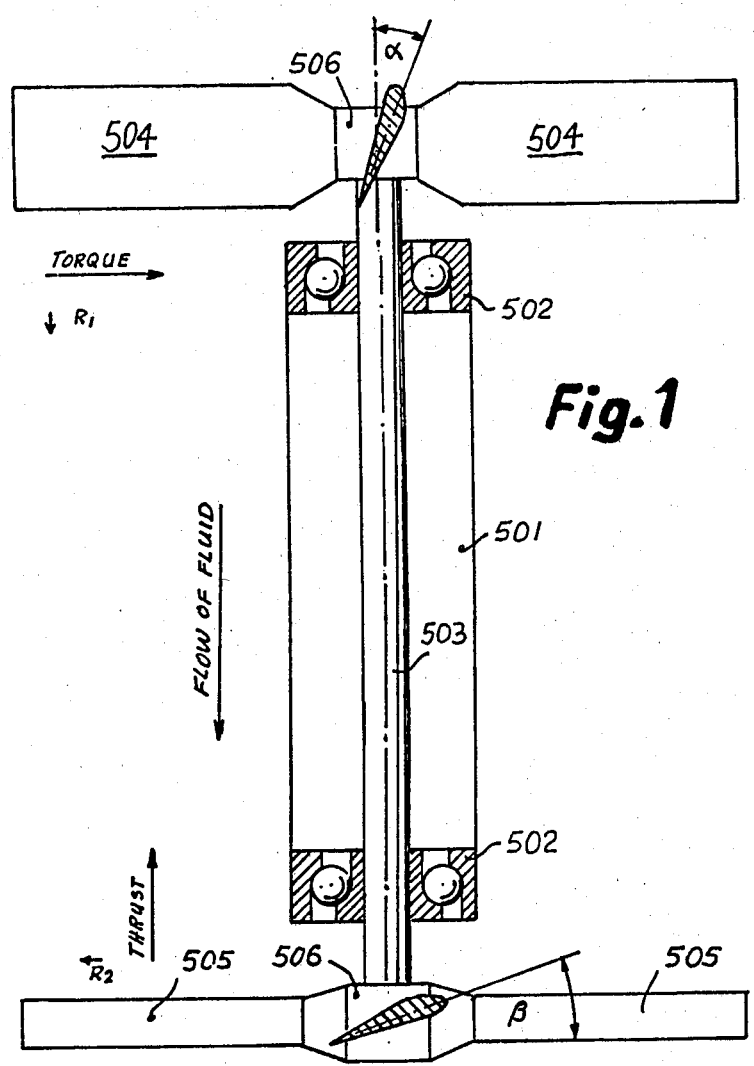
FIG. 1 is a longitudinal sectional view through a unit of the invention.

FIG. 1 demonstrates a thrust unit which has a body 501 with bearings 502. A shaft 503 is revolvingly borne in the bearings 502 and the bearings 502 are capable of carrying a thrust in one of the axial directions. Shaft 503 holds a front propeller 504 and a rear propeller 505, to revolve the propellers in unison when the shaft 503 revolves. The front propellers 504 have angle of attack "alpha" while the rear propellers have angle of attack "beta". Note, that the bases for the angles of attack are 90 degrees turned between the front- and rear-propeller. When a fluid streams from top of the figure towards the front propeller 504 or when the entire unit moves upwards in a resting fluid, the relative fluid-stream, which might also be a water stream or an air-stream moves downwards in the figure, relatively to the front propeller 504. The angle of attack alpha then provides a rotation of the front propeller and thereby also of the shaft and of the rear propeller in the direction to the right in the figure. The angle of attack beta then creates a thrust in the direction of the arrow with the word "thrust", which is a thrust in the direction upwards in the figure. The direction of thrust is thereby contrary to the direction of the fluid stream or of the arrow with the word "Flow of fluid".

The feature of this arrangement of FIG. 1 is, that a thrust can become obtained, which may be directed contrary to the movement direction of the driving fluid stream. For example, the front propeller may be set into the wind and the rear propeller may be set into the water behind a boat. The boat will then be able to run against the wind. The entire unit may also be set into the wind and it will then give a thrust against the wind. For example, the unit may also be mounted onto an aircraft and the forward flight speed of the aircraft may then be utilized to obtain a thrust of a local place on the aircraft in the direction forward. The propeller pitches may be fixed or variable. When they are variable, the angles "alpha" and or "beta" may be variable. The thrust will increase with the increase of the flow of fluid. For example with the forward speed of the aircraft.

With variable pitch propellers the size of the thrust can be varified. The unit may be used also, to incline wings, propellers or other members of the aircraft in dependency on the forward speed of the aircraft. It may also be utilized to obtain and maintain a rotary movement, when the unit moves relatively to the air or when a fluid flow moves along the unit in the direction substantially parallel to the axis of shaft 503.

Figure 2:
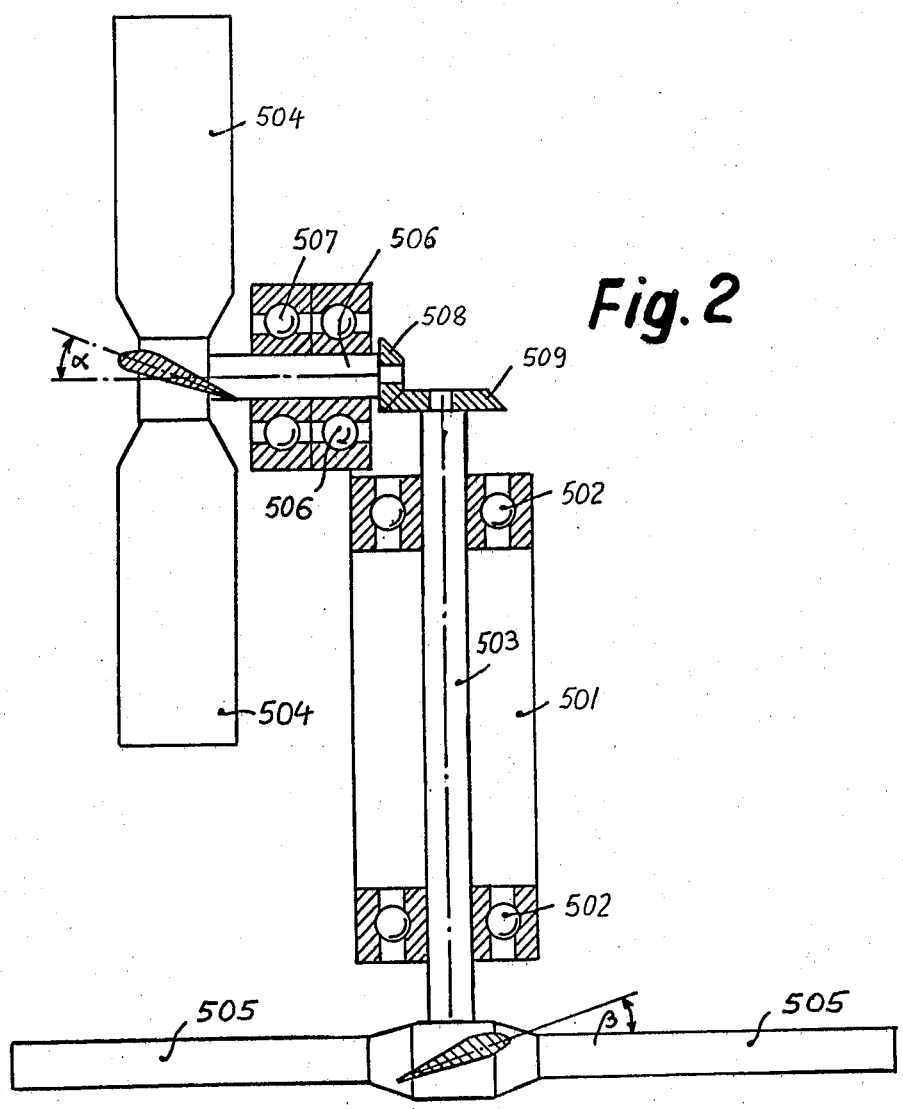
FIG. 2 is a longitudinal sectional view through another unit.

FIG. 2 demonstrates a modification of the unit of FIG. 1. It has in addition to the parts of FIG. 1 a second shaft 506 revolvably borne in further bearings 507 and an angular gear 508, 509 between the first shaft 503 and the second shaft 506. In the figure the preferred arrangement is demonstrated wherein the first and second axes 503 and 506 are normally directed relatively to each other. The angular gear 508, 509 revolves the first shaft 503, when the second shaft 506 revolves.

The practical application of this figure is, that a fluid flow relatively along the second axis will provide an upwards directed thrust. For example, when it is mounted on a forward moving air-borne craft, the forward movement will provide an airflow along the axis of the second shaft 56 and with the angle of attack alpha revolve the front propeller 504. Gears 508, 509 will transfer the revolution of shaft 506 to shaft 503 and thereby revolve the rear propeller 505. The rear propeller 505 will then by the angle of attack beta give an upwards directed thrust. In suitable arrangements, the thrust of propeller 505 may carry the air-borne craft, whereby wings may be spared on the air borne craft. As will be seen at the later discussion of FIGS. 4 and 5, the unit can be used to transform a multibladed helicopter into a glider, whereby a helicopter can continue to fly as a glider, when the engines to drive the rotors fail.

Figure 3:
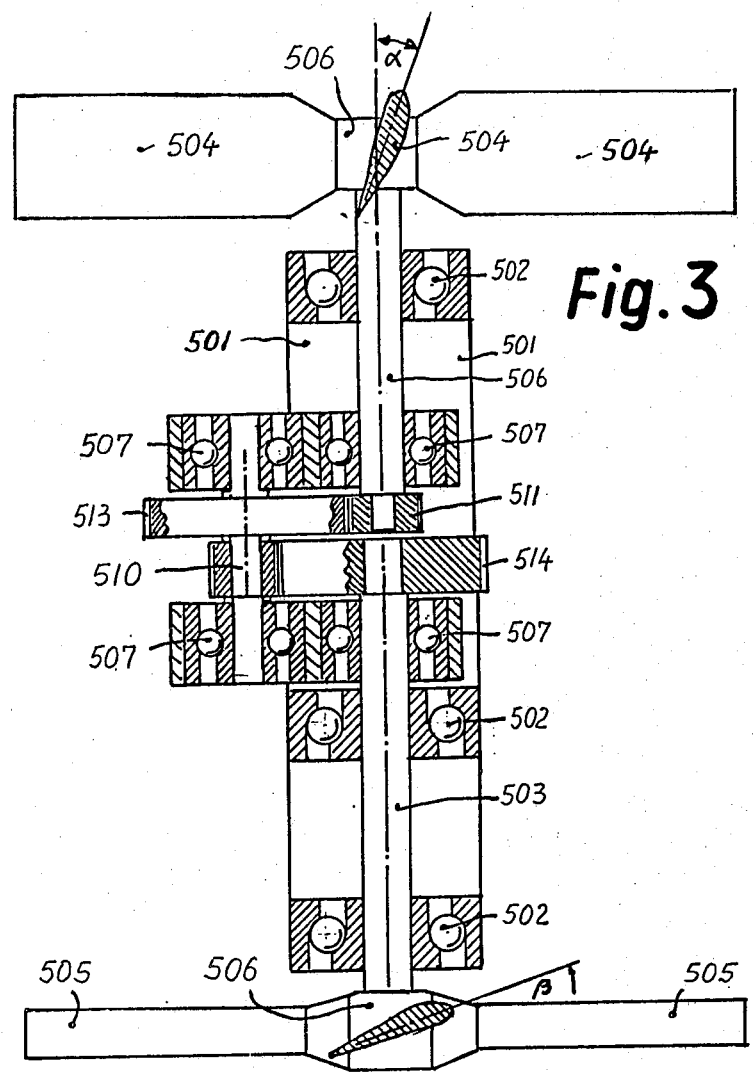
FIG. 3 is a longitudinal sectional view through still a further unit.

FIG. 3 shows, that a speed-up or a speed-down gear may be provided between the front propeller and the rear propeller. In the same way, the angular gear 508, 509 of FIG. 2 may be a speed-up or a speed-down gear and the gear arrangement of FIG. 3 may also be provided in FIG. 2. Additional bearings 507 serve to bear portions of shafts 506 and 503 or to bear a third shaft 10. The gears 511 to 514 are provided on shafts 503, 506, 510 to form the described speed-up or speed-down gear. With the gear means between the front propeller 504 and the rear propeller 505 any desired ration of relative speed of propeller 505 relatively to propeller 504 may be obtained.

FIG. 4 demonstrates together with FIG. 5 a multibladed helicopter with plural rotors. Such helicopters with multi-rotors are generally known. They are however assumed to achieve by the pilot's control action, an auto-rotation of the rotors, when the engine failes to drive the rotors. The auto-rotation should then effect an emergency landing. Very often however, the emergency landing becomes a failure and the helicopter crashes. That occures, because the autorotation must be utilized to effect a change of angle of attack of the propeller blades shortly before the craft reaches the ground. If the height is misjudged, the craft may not obtain the desired break of the speed of descent and may fall with too much speed against the ground. This matter is more dangerous in the present time, as the propellers are becoming lighter and thereby of less mass. The lower mass of the newer rotor blades reduces the moment of inertia of the blades and thereby reduces the number of revolutions, which with the blades would continue to turn during the emergency landing autorotation flare out maneuvre. Therefore, the time duration for the emergency landing maneuvre is reduced with with contemporary lower mass propellers relative to the heavier propellers of the past.

The emergency landing maneuver in auto-rotation of the past and present is therefore no longer the ideal solution for an emergency landing. The invention therefore provides a novel kind of emergency landing for a helicopter. This novel system of the invention is, not to land in auto-rotation with descent-speed break maneuver close to the ground, but to transform the helicopter into a glider, when the engine(s) fail to drive the rotors of the helicopter.

While FIGS. 4 and 5 demonstrate one of the methods of the invention to transform a helicopter into a glider, FIGS. 28 to 44 show related systems with other means, than in FIGS. 4 and 5, to provide the glider performance to the helicopter.

The helicopter of FIGS. 4 and 5 has multiple rotors 15 to 22 with substantial vertical axes to carry the craft including its body 1 which may have the power plants and passenger cabin or other compartments, fuel tanks etc. Each rotor is borne by a shaft with a free wheeling arrangement 25. Some rotors, for example, 15 to 18 may in addition to the free-wheeling arrangements 24 have revolution—drive arrangements, for example, fluid motors 25 to revolve the rotors 15 to 18 over the fluid motors by the power plant.

Each free-wheeling arrangement 24 and thereby the respective bearing rotor 19 to 22 is held by a holder 23. In addition to the rotors with the substantial vertical axes, the craft is provided with at least one propeller 28,29 with a substantial horizontal axis. In the FIGS. 4 and 5, the craft has two or more such propellers 28,29. The propellers with the substantially horizontal axes are driving propellers, while the propellers with the substantial vertical axes are the carrying propellers, or the bearing propellers. The bearing propellers are bearing the craft in the air, while the driving propeller may be utilized to drive the vehicle forward in the air.

The driving propellers may therefore also have drive-arrangements for example, fluid motors 27 to revolve the propellers. The driving arrangements of the bearing propellers and of the driving propellers may be actuated and be driven by the main power plant, for example in body 1, by a transmission means for example by a fluid pump and fluid lines, when the drive arrangements include fluid motors to drive the respective propellers.

The drive means to drive the driving propellers are however not in all cases required. Required is to each driving propeller 28,29 however a transmission means and/or free wheeling means, 26,8,9,29 to 32. The transmission means transfers the rotary movement of the propellers 28 and/or 29 to one or more of the propellers 19 to 22. This can be done for example by the arrangement of FIG. 2 or any other suitable solution.

Considering now, that the craft is flying with the forward movement parallel to the horizon as shown by the arrow between the figures under power of the power plant, when at least propellers 15 to 18 are driven and revolved by the power plant over the respective transmission means, which might include the fluid motors 25.

When then suddenly the power plant or all of the power plants fail(s) or fluid line breakes, the pilot will incline immediately his craft slightly downwards with the front portion, as shown in FIG. 4. The craft still has the full forward directed flight speed.

The flight speed will then drive the drive propeller(s) 28, 29 as demonstrated in FIG. 4. The free-wheeling arrangement will over-run the connection to the fluid motor or first transmission.

The forward speed of the craft will create the fluid flow of FIG. 1 along the propeller 4 of FIG. 2 and thereby along the axes of propellers 28 and 29. The transmission of FIG. 2, which might split into plural exits to plural propellers, will now drive the bearing propellers 19 to 22 or a plurality thereof. Similarly as propeller 4 drives propeller 5 in FIG. 2.

The high-speed forward movement of the craft will provide a strong torque on the propellers 28,29 which is strong enough to drive the propellers 19 to 22. It should be noted, that propeller(s) 28,29 may have a great angle of attack, while the bearing propellers 15 to 22 may have only very small angles of attack. The drag of the bearing propellers 15 to 22 is thereby small, while the thrust or lift of the blades of propeller(s) 28,29 is very high, because of the great angle of attack and because of the high forward speed of the craft. At this moment the craft has no downward or upwardly directed speed, because it flew horizontally, when the power plant failed. The gravity however acts on the weight of the craft and starts to pull to craft downwards to the ground. The craft thereby obtaines the direction of movement as shown by the arrow between the drawings. This direction of movement after the engine failure is directed strongly forward and slightly downwardly as such of a glider. The gravity pulls the craft downward, but since the forward speed drives the propeller(s) 28,29 and the said propeller(s) 28,29 thereby drive, as shown in FIG. 2, the bearing propellers 15 to 22 with the vertical axes, the bearing propellers 15 to 22 are continuing to bear the craft. However under loss of some height, because the craft now moves in the slightly downwardly inclined direction of the arrow of movement. The direction of movement maintains itself under the force of the gravity. Thereby the foreward movement is maintained and the bearing capacity is maintained, however, under loss of some height.

Thus, the arrangement of FIGS. 4 and 5 provides a multi bladed helicopter, which does not require an autorotation descent speed break maneuver, but which flies on as a glider under loss of some height but under maintainance of the forward speed. Even, the forward speed may slow down slightly, the craft glides, but does not fall downwards. The pilot might look for a suitable landing place on the ground to land on wheels or on slides. For example, as an aircraft or as a glider. The arrangement of these figures therefore provides an effective emergency landing means.

The free-wheeling arrangements 25 make sure, that the change from power-plant operated flight to emergency gliding flight appears automatically without adjustment by the pilot. However, when the pilot listens, that the power plant has stopped or otherwise becomes aware of the failure of the power-plant drive of his craft, he should actuate a shift of the gravity centre of his craft to icline the craft slightly downwards forwardly, to obtain an optimum gliding angle. A gravity centre shifting device 30 may be respectively provided in the craft. The pilot may control his gliding flight to the emergency landing place by the gravity shifting device 30 to icline his direction of movement sharper or softer relatively to the horizon and by the actuation or control of his side rubber 2 for yaw axis control.

FIGS. 6 to 8 demonstrate a motorglider of the invention. In common motor gliders with retractable propellers it was custom to swing a single propeller out of body 1 of the craft. Mostly that is done upwards. This common system to swing the propeller out and into the body of the glider has however certain disadvantages. For example, the centre of thrust of the propeller is not in the axis of the drag of the craft. Thereby the sudden swing out of the propeller provides a sudden uncentric drag and influences negatively the flight path and stability of the flight of the glider. The sudden start of the propeller provides a second sudden negative influence in the flight of the glider. Both influences are appearing suddenly and they are demanding a piloting skill from the pilot to prevent a crash of the glider under uncentric sudden drag or thrust.

The invention therefore provides in FIGS. 6 to 8 a glider arrangement of the invention, which drastically reduces the negative effects of the swing motors of the common motorgliders. The invention provides at least one pair of propellers 9,10 arranged symmetrically relatively to a medial longitudinal vertical imaginary plane through the body 1 of the motor glider. The propellers 9, 10, of the propeller pair are held on holder arrangements 8 and are driven by a drive means 7. I prefer to use fluid line pipes as holders 8 and to use fluid motors as drive means 7. The fluid motors are then driven by a double flow pump, while the pump is driven by an engine. Engine and pump can be located and remain at all times in body 1 of the motor glider.

Thereby the first feature of this embodiment of the invention appears, and is, that not the entire engine is swung in and out of the body, but only the propeller with the rather small and light fluid motor(s) 7.

The second feature of the invention is, that both propellers 9 and 10 are swung out symmetrically and in unison. That is seen in FIG. 6. Therein the fluid motors 7, the holders, fluid lines, 8 and the propellers 9,10 are shown in the position, whereat they are located in the body 1. That is the first position of location of the propellers.

Therafter the propellers are schematically demonstrated in the second position of location by 13 and there the third feature of the motor glider of this embodiment of the invention becomes apparent. It is, that at this second position 13 the propellers can start to revolve, and that at this position only a small drag is added to the glider, the drag is added symmetrically of the body of the craft and thereby sums up to a drag in the centre line of the craft, and, in addition the thrust now acting forwardly is only small, and corresponds to the reaction force to arrow 15 of FIG. 6. The rest of the thrust of the propeller is directed along arrows 16 towards the body of the craft. Thereby only portion 15 of total thrust 14 is in the second position 13 of the propellers acting forwardly on the body 1. Or, in other words, at position 13 the motor glider obtains smoothly a slight forward thrust and the thrust is acting substantially along the medial centre line of the body of the craft. Any lateral influence on the flight path of the glider of the invention is prevented.

The next position is the third position and location 11. The thrust in forward direction is now increased and obtains now about 71 percent of the entire thrust. Again, the thrusts sum up to a combined thrust in the longitudinal axis of body 1. The fourth position and location of the propellers is shown by their positions 9 and 10, when the blades of the propeller are substantially parallel to the wings 2 of the glider. At this position and location the entire thrust of the propellers 9 and 10 is now acting forwardly on body 1 of the glider. The holders 8 are partially shown in this position in FIG. 6 and the drive means or fluid motors 7 are fully shown in this fourth location and position of the propeller pair 9, 10. While four locations have been shown, namely those of the location in the body, swung out 45 degrees, swung out 60 degrees and swung out 90 degrees, it should be noted that the swinging out can be done steplessly. A very smooth build up of the thrust is then obtained. And any lateral disturbance of flight are prevented. The arrangement of this embodiment of the invention therefore acts very smoothly and is very convenient in handling. At the same time it prevents all sudden lateral drags and thrusts and disturbances of the flight path of the vehicle.

The swing-out and the swing-in may be done around the swing bars in swing bearings 3 and 4. If fluid motors 7 are used to drive the propellers 9,10, respective fluid lines may extend through or along swing means 3,4 and the fluid may flow through holding pipes 8. Otherwise a transmission portion will be extended through or along swing means 3,4 and through or along the holders 8 to the drive means 7 of the propellers 9,10. Flexible transmission means or flexible fluid pressure hoses may be set between the engine or pump and the swing means 3, 4. A device may be added to swing the holders 8 around the swing means 3 and 4 respectively and in unison.

An additional feature of the invention may be provided as demonstrated in FIGS. 7 and 8. Therein the glider is shown from the front and shows the propellers 9,10 in FIG. 6 in the flight position, but in FIG. 7 in the take off or landing position. In the flight position of FIG. 6 the propellers 9,10 are substantially behind or before the centre line of the sum of drags of the body 1 and of the wings 2. Thereby any lateral disturbing thrust or drag is fully prevented. The location of the propellers is now ideal as in a common aircraft. When however at start or landing the tips of the revolving propellers would become too close to the ground, it is better to swing the propellers slightly upwards. The centres of thrust of the propellers are then above the centre line of drag of the craft. But, since the swing-up can be handled steplessly, a respective control action by the elevators can smoothly and in unison with the swing-up operation keep the craft in a straight flight path. FIGS. 6 and 7 therefore demonstrate second swing arrangements 5 and 6 which are preferredly normally arranged respectively to the first swing members 3 and 4. For example the swing members 5,6 may be mounted on swing members 3,4 or vice versa.

The arrows in FIG. 6 as far as they are within body 1, are demonstrating the action of swing of means 3,4 and the arrows in FIG. 7 are demonstrating the action of swing of swing means 5 and 6.

With these arrangements of the invention, a superior motorglider is obtained. The arrangement can be a complete built-in unit to be assembled to existing gliders. It can also be used in common aircraft. For example to provide additional propellers for take off.

FIG. 9 demonstrates an improved propeller of the invention. It has one first propeller body 4 with a second propeller body 5 axially guided and extendable in the first propeller body 4 and a third propeller body 6 axially guided in and extendable in the second propeller body 5. The figure shows the propeller bodies in the most outwardly extended positions and locations. The other extreme position is, that the third and second propeller bodies are fully retracted into the first propeller body 4. The propeller body 4 may be provided in a revolving disc 3 or laterally distanced from the drive motor 1 with shaft 2, if so desired. Such arrangement makes especially large differences between the smallest and biggest extensions of the propeller portions possible, and a second propeller set 16 may then be provided diametrically opposite relative to the propeller holding and driving shaft 2. The end plates 7,8 are serving to direct the flow along the tips of the propeller bodies and also to arrest the second and third propeller bodies in the innermost positions.

To control the locations of the propeller bodies either in their outermost or innermost positions or in any other position steplessly therebetween, the following arrangement is preferred in accordance with the present invention.

A fluid line extends from a pressure supply device along or through holding- and drive-shaft 2, wherefrom the fluid line(s) 13 are extending into or along first propeller body 4. A fluid line 14 extends along or through body 4 into the radially outer portion of the second propeller body 5 and into a cylinder 10 which is arranged in the second propeller body 5. The first mentioned fluid line 13 extends into the radial outer portion of a cylinder 9 which is arranged in the first propeller body 4. A valve—not shown in the figure—is provided to permit the opening of the fluid line which leads to fluid line 13. When now the propeller(s) which might include the medial disc 3, revolves, the second and third propeller bodies 5 and 6 are moving outwardly to their radial outermost position and location under the centrifugal force of the weights of the mentioned bodies. The propeller bodies are obtaining the positions which are shown in the drawing of FIG. 9. The propeller now provides the highest possible thrust at a given revolution per unit of time. These positions of the propeller bodies are especially suitable as helicopter propellers for vertical take off, landing or for hovering.

When the aircraft has obtained a forward speed, the large diameter propellers of the demonstration in FIG. 9 may become uneconomic or may provide too large a drag. It is then preferred to retract the propeller arrangement to a smaller outer diameter or to shorter propeller arms. The second and third propeller bodies are then partially steplessly or entirely subtracted into propeller body 4. The retraction into the first propeller body 4 may be done by mechanical transmission means. I however commonly prefer the hydrostatic retraction device, which is illustrated in the figure. Because this device is specifically safe in operation, easy in handling and it can be provided easily for the operation of plural propeller arrangements in unison. In such case a fluid is led through the fluid lines into the mentioned cylinders 9 and 10, wherein pistons 11 and 12 are reciprocable. Since the fluid lines 14 and 15 enter the outer portions of the cylinders 9 and 10, they are entering radially outwardly of the fiiting heads of the pistons 11 and 12. Any quantity of fluid which is led through the fluid lines 13, 14,15 into the cylinders 9 or 10 therefore drives the pistons 11,12 in their cylinders 9,10 radially inwards and thereby retracts the second and third propeller bodies 5 or 6 into the respective propeller body 4 and 5. The quantity of fluid pressed into the cylinders decides how far the respective propeller body shall become retracted. Since the fluid pressure must act against the centrifugal force of the respective propeller body, the pressure in fluid will decide, which propeller body retracts how deeply into the respective other propeller body.

It will be easily understood, that the play of forces which act by centrifugal weight and by fluid pressure, a number of different propeller assemblies as in FIG. 6, can be handled from a single fluid pressure supply device in a fluid borne craft to retract and move out in unison.

While first, second and third propeller bodies 4,5 and 6 have been shown in the figure, it may be possible, if size and strength permit, that other numbers of bodies may be applied, depending on design, requirements and strengths. For example a first and a second propeller body or even a first, a second, a third, a fourth and a fifth propeller body or more propeller bodies. In FIG. 9 the diameter of the propeller circle is variable almost 3 to 1. That defines a variable circle area of $3^2$ or 9 to 1 for the propeller circle. The lift of the propeller in outermost extended location, as in FIG. 6, will thereby be roughly two times higher at equal power consumption and revolution, than in the innermost retracted position of the propeller bodies, when the propeller is used in stand or for hovering of a helicopter. In the retracted position, which is the innermost location of the propeller bodies, the propeller will have little drag or no drag, when retracted into the disc 3. The arrangement is then suitable for higher speed forward flight.

Thus, the invention of this embodiment provides a stepplessly variable diameter of a propeller arrangement, suitable for aircraft and high-speed flight as well as for vertical take off aircraft or helicopters.

The consequences of the arrangement of the invention will be better understood at hand of the application in a craft of practical use which is demonstrated in FIG. 10.

In FIG. 10 a vertical take off and landing aircraft of the invention is demonstrated, which can also fly forward as an aircraft with forward speed. It may also land or start as a common aircraft if so desired. The feature of this embodiment of the invention is, that the aircraft can in flight transform from a helicopter like craft to an aircraft like craft. Due to another feature of the invention, it can transform steplessly from vertical craft like a helicopter to a horizontal moving craft, like an aircraft and vice versa. In addition, another feature is, that it can carry relatively heavy loads vertically off at vertical start and down at vertical loading. And, still a further feature is that it can do its actions with good economy and with relatively small and light engines or power plants with limited power and fuel consumption.

In FIG. 10 the craft has a body 1 which may contain the passenger—and/or freight compartment, the pilot's cabin or cockpit and the power plant. If the craft is operated hydrostatically or hydraulically the body 1 may also contain the respective pump(s) connected to the respective power plant(s). Laterally from body 1 the wings 2 are extending. A propeller 9 is driven by shaft 8 and has a substantially horizontal axis to drive the craft in the forward flight as an aircraft, borne on wings 2. Instead of one forward driving propeller 8, there may be a plurality of such propellers provided. This propeller(s) is(may) be driven by a separated power plant or be driven hydraulically from the main or common engine or power plant or power plant set in body 1. Elevators 10 and side rudder 11 are provided as usual to control the flight path and location of the craft during movement in the air.

According to the invention, the wings 2 may be substantially formed as the propellers of FIG. 9. For example, the wings 2 may be formed similar as the first body 4 of FIG. 9 and the second bodies 555 may be retractable into the first bodies 222 of the wings 2. The third bodies 666 may be retractable into the second bodies 555 as it was handled in FIG. 9. Thereby, the second and third bodies 555 and 666 may be entirely or steplessly fully extended radially from first wing bodies 2 and thereby laterally of body 1 of the craft into the autermost position or be retracted steplessly into the innermost position. In the innermost position the second and third bodies 555 and 666 are fully retracted into the first wing bodies 222.

The feature of this arrangement is, that the craft can start, land and fly at lower speeds with the wing bodies 555,666 fully extended to the outermost position, while it can also fly at high forward speeds with little drag when the second and third wing portions 555,666 are fully retracted to the innermost position. Any position and action therebetween is possible, when the arrangement is done stepplessly as in FIG. 9. Since the wing bodies 555 and 5 have no centrifugal force, the outward movement of them may be handled by spring means or by hydraulic means by replacing the one way pistons and cylinders of FIG. 9 by double way acting pistons and cylinders with a respective number of fluid lines and controls. When no variable wings 222,555,666 are required, simple, fixed wings 2 may be used.

For vertical take off and landing, for hovering in air, or also for relatively low speed forward flight, breaking in the air or backward or sidewards flight, the craft is provided with at least one propeller 5. I prefer to use at least one propeller pair or a plurality of propeller pairs and I prefer to drive the rotation of the propellers hydraulically. In FIG. 10 two pairs of propellers are shown and the propellers are corresponding in this example to the propellers of FIG. 9. One sees in FIG. 10 four propeller holding shafts 7 with discs 3 of FIG. 9. Each propeller disc 3 contains the first propeller bodies therein and the figure shows the second and third propeller bodies 5 and 6 extended to their outermost positions. At this location of the propeller pairs, the hydraulic motors which drive the propellers and the fluid lines which are forming the holding structures to hold and drive with the fluid which flows therethrough the revolutions of the propellers are not visible. Because the sizes of the structure and of the fluid motors are typically smaller than the sizes of the propellers and of their holding discs 3.

In this arrangement of all propeller bodies in the outermost position, the craft obtains a very high load capacity for vertical take off, landing and hovering as well as for forward flight with limited speed. As explained at hand of FIG. 9, the lifting capacity in outermost position of all propeller bodies is about double of that of first propeller bodies only when the same power is used to drive the lift and bearing propellers 3,5,6. For such applications, where the arrangement of FIG. 9 of the propellers is too expensive, simple propellers may be used and the discs 3 may also be spared, if so desired. That however goes on the expense of the extensive utility of the craft.

When the craft obtains a certain forward flight speed under propeller(s) 9 or other propulsion means, the second and third propeller bodies 5 and 6 of first propeller bodies or discs 3 may become gradually retracted in relationship and depending on the rate of forward speed. Until finally the second and third propeller bodies 5 and 6 will be entirely retracted into the first propeller bodies or discs 3. This will be accomplished fully, when the craft has obtained a respectively higher forward speed. At this time of second and third propeller bodies 5,6 completely retracted into their innermost position, the discs of first propeller bodies may act as small lifting bodies would act and may help to carry the craft.

With still further advancing forward speed the front propeller sets 3,5,6,7 will be swung forward until they are moved at least partially into the body 1 of the craft. The rear propeller sets 3,7,5,6 will be swung backward until they are at least partially located within body 1 of the craft. The swinging into the body 1 will be done for example, as in FIG. 6. The propeller sets 3,5,6,7, may either be swung entirely into body 1 as done in FIG. 6 or they may be swung partially into body 1. A preferred solution of swinging them partially into body is demonstrated in FIG. 10 by the location of the discs 3 partially in the body 1. In this location the discs 3 are cited by the referentials 3—3. The discs 3—3 are now forming small wings and may be used to help to carry the craft at very high forward speed or to help to assist the stability of the craft at speedy forward flight. The craft now has wings 222,555,6661 and the pairs of front and rear wings 3—3.

For still higher forward speeds with less drag-area, the third wing bodies 666 may be retracted. Thereafter for still higher forward speeds the second wings 555 may become rectracted. Or, the second and third wings 555,666 are retracted partially and in common as in FIG. 9 the second and third propeller bodies 5 and 6 are retracted. Finally the second and third wing bodies 555 and 666 may be entirely retracted into the first wing bodies 2 for very high speed forward flight. For still higher speed forward flight, the partwingpairs 3—3 may be further retracted into body 1 and at highest forward speed the wing pairs 3—3 may be entirely retracted into body 1.

When the craft nears the destination, the respective portions may become gradually extended. For example the wingpairs to 3—3, thereafter the second and third wing bodies 555,666. And finally, for the landing also the propeller pairs 3,5,6,7 will be extended to the outermost positions as seen in FIG. 10 for the vertical landing on a small field or place of destination. When the destination however is an airport with a runway, the extension of the propeller sets 3,5,6,7 may not be required or may be done only partially.

The craft of the invention of FIG. 10 is therefore able to fulfill a great number of duties. For example, vertical take off and landing, hovering, and also medial and high or vey high forward speed flight.

In FIGS. 11 to 13 another embodiment of an aircraft of the invention is demonstrated. It serves for a shorter runway of take of and landing. It may also make an aircraft capable of an immediate inclined angle take off and landing without a runway.

The embodiment of the invention obtains its capability and aim by the provision of a retractable wing set. For example of each one or more retractable wing(s) at the left and right of the body 1 of the craft.

In FIGS. 11 to 13 again the body 1 may contain the passenger and/or frequent compartments, the power plants, if provided also the hydraulic pumps, and at least the pilot's cabin or cockpit 10. Laterally from body 1 are the wings 2 extended, whereof the left one is only partially shown in the FIG. 11. Wings 2 may be provided with driving means 4 to drive the revolving motions of propellers and with propeller(s) 5. This arrangement is the common arrangement of this type of aircraft.

According to this embodiment of the invention however, a pair of assistance wings 3—3 with additional drive means 6 to revolve the propeller(s) and additional propeller(s) 7 is provided. I prefere to locate the assistance wings 3—3 behind the main wings 2 and I also prefere to incline them to a steeper angle of attack. For example to 30 degrees, 45 degrees or even to 60 degrees. Or to any other suitable angle of attack. Since the assistance wings 3—3 have propellers with axes substantially equal to the medial line through the chord of the respective assistance wing or only slightly inclined relatively thereto, the assistance propellers 7 of the assistance wings are helping to draw a flow of fluid over the main wings 2. That prevents stalling of the main wings 2 at least partially and it also assures a flow of air over the assistance wings 3—3 without stalling of the wings. Even if the stalling may not be entirely excluded, it at least reduces the possibility of stalling very drastically, when the arrangement of the invention is applied.

The assistance wings 3—3 with the assistance propeller(s) 7 will help the craft to get airborne after a shorter runway length and with smaller speed. It may even provide an immediate inclined take off and landing without any considerable runway. The effect on the runway and take off and landing possibilities will depend on the size of the assistance wings, on their angles of attack, on their location relatively to the main wings 2, on the size and revolutions of the assistance propeller(s) 7 in addition to the sizes of the main wings 2 and main propellers 5 as well as on the speeds of the main propeller(s) 5.

Once the aircraft of this embodiment of the invention has taken off and obtained a certain forward flight speed it is convenient to reduce the drag and power consumption of the craft in order to obtain a still higher forward speed. Therefore the assistnce wings of the invention are provided with a swing in and swing out capability. The assistance wings 3,3—3 may gradually and steplessly or immediately completely be swung into the body 1. For example, as the propellers of FIG. 6 are swung into the body 1. Any location between full extension and full retraction into the body may be used for partial utilization of the thrust of the assistance propeller(s) 7 and of the lift of the assistance wing(s) 3,3—3.

For example, substantially similar as it is the case with the retractable propeller(s) of FIG. 6.

In FIG. 11 the assistance wings are also shown in the innermost retracted position. At this position they are cited with the referential 3. In the outcut of FIG. 11 one sees the fully retracted right side assistance wing 3 once in the innermost retracted position with referencial number 3 and also the innermost retracted position of the left side assistance wing, also with referential 3. Also shown in FIG. 11 is the outermost extended position of the right side assistance wing with referential 3—3, which demonstrates the outermost position of the right side assistance wing 3. The outermost location of the left side assistance wing 3,3—3 is not shown in the figure, because there is no space for it on the paper and also it is easily understood without writing it into the figure, because it is symmetrically to the wing 3—3 of the right side of the craft, respectively to the medial vertical longitudonal imaginary plane of body 1.

For making the swing in and swing out possible, the body 1 is provided with respective swing bars 11, bearings 8 therefore and holding arrangements 9 therefore. For the right side assistance wing as well as for the left side assistance wing 3,3—3. The swing out may be effected mechanically, if so desired. I however prefere to use hydraulic equipment to drive and accomplish the swing in and swing out operations. For example, hydraulic motors, pistons, cylinders swings or the like to be operated by fluid pressure and to be controlled by valves or flow quantity controller or pressure controllers respectively.

The FIGS. 12 and 13 are sectional figures taken along the arrow-line in FIG. 11. They are demonstrating, that a single swing bar 11, supported in a air of bearings 8 is enough to hold and guide the assitance wings 3,3—3 in all of their positions including in the innermost retrcated and outermost extended positions. FIG. 12 shows the assistance wings with 45 degrees inclination relatively to the forward flight movement and FIG. 13 demonstrates the inclination of 60 degrees of the assistance wings 3,3—3 relatively to the forward movement direction of the craft. The figures are showing that at these angle of the wings, they have adequate space in the body to be retracted into body 1. While the holding bars and swing bars 11 are shown vertically extended in the craft, it would also be possible to provide them in an inclination in bearings 8 in order to effect other angles of attack of the assistance wings. Also a combination of swing arrangements as in FIGS. 6 to 8 is possible in order to change the angles of inclinations of the wings accordingly.

The arrangement of this embodiment of the invention provides a very effective assistance to the aircraft for short take off and landing or even for inclined angle take off and landing as well as for low landing and take off speeds or for carrying of higher loads. And the arrangement obtains these features by most simple construction, design and cost at low weight.

The actual design and building of the craft of this embodiment is rather easy and reliable, when my fluid motors and fluid pumps are used to drive the propeller(s) 7. Flexible hoses can easily be set from the pump to the swing arrangement. The wings 3,3—3 may be built around a fluid pipe structure to the motors, as for example illustrated in FIGS. 20 to 22. Also the main wings 2, motors 4 and propellers 5 may be of similar construction or also be hydraulically driven and operated.

FIGS. 14 to 19 show still further assistance wings or general wings in accordance with further embodiments of the invention. The wings are here in these figures shown schematically in cross-sectional views taken parallel and vertically relative to the direction of forward flight through the respective wings.

All these figures are showing a main wing 2 and an assistant wing 3 in different locations relatively to the main wing 2. Each of the assistance wings 3 is provided in these figures with an assistance propeller 4,26, while each main wing 2 has a main propeller 5 or 16. The propellers are driven by respective drive means to revolve. These drive means may be engines, individual power plants or remotely mechanically or electrically driven drive means. I however prefer to use my hydraulic motors to drive the propellers for example by hydraulic motors 7,6,27, while the mentioned hydraulic motors are driven by a respective pump arrangement which is driven by a prime mover or primary power plant. The hydraulic drive permits an easy laying of pipes as fluid lines and of flexible fluid line hoses. The hoses permit the easy varification of location of the respective wings,motors,propellers, while the pipe fluid lines permit the building of a structure to hold the wings, motors and/or propellers.

Figure 14:
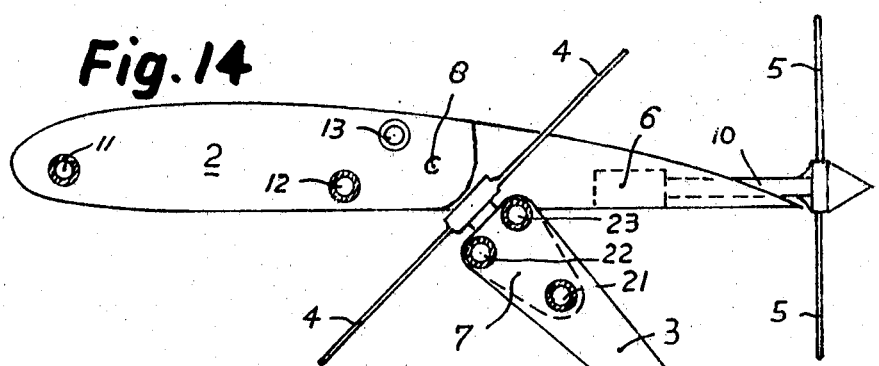
FIG. 14 is a longitudinal sectional view through wings of the invention.
Figure 15:
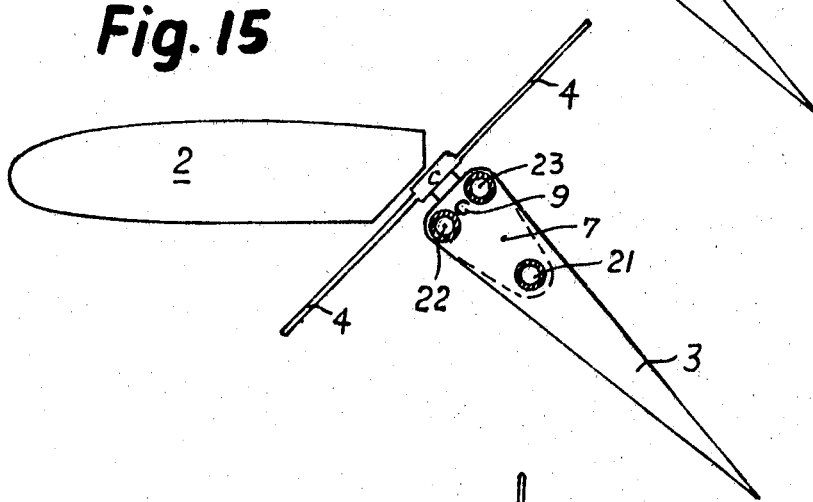
FIG. 15 is a view as in FIG. 14, however with a modified wing portion.
Figure 16:
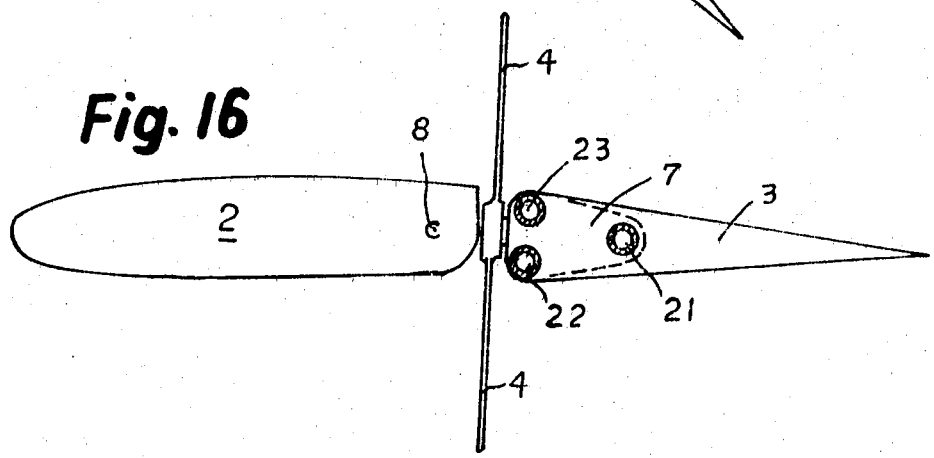
FIG. 16 is a view as in FIG. 14, however with another modification.
Figure 23:
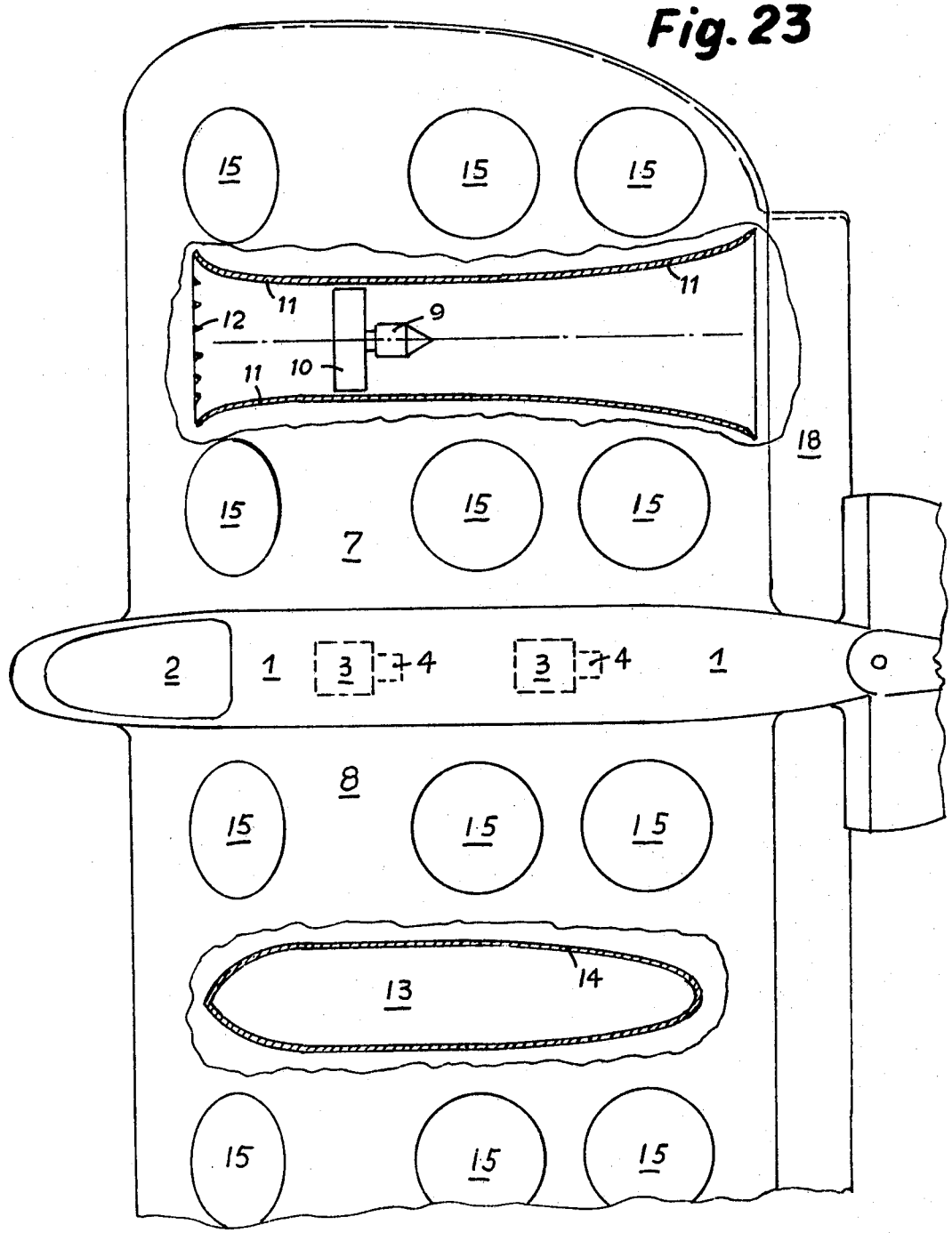
FIG. 23 shows another craft seen from above, partially in horizonal sections.

FIG. 14 with FIGS. 15 to 17 show the main wing 2 with a pipe structure 11,12,13 to form the holding bone structure of wing 2 and also to hold the motor(s) 6 to drive the main propeller 5 for example over shaft 10. One or more of the pipe structures 11, 12,13 are commonly used in my devices to carry the fluid to and from fluid motor 6. How the pipes 11 to 13 may form the structure for the wing(s) is shown in FIGS. 20 to 22 by way of example.

Wing 2 is provided with an assistance wing 3. Assistance wing 3 is pivotable around swing centre 8 or around swing centre 9. The assistance wing 3 is provided with a drive means 7, for example, with hydraulic motor 7, to drive a propeller and the assistance wing 3 is provided with a propeller 4 or assistance propeller 4, to be revolved by drive means or fluid motor 7.

FIG. 14 shows the main wing 2 and the assistance wing 3 wherein the assistance wing 3 is strongly inclined relatively to the main wing 2. This is preferred for take off, landing and in flight with heavy load. In FIG. 14 the assistance wing 3 is pivoted around the pivot centre 8, while it is pivoted in FIG. 15 around a slightly differently located pivot centre or swing centre 9.

In FIG. 16 the assistance wing 3 is shown in the swung up position for speedy forward flight with utilization of assistance propeller 4.

When however, the assistance propeller 4 is not required in speedy forward flight and when it would cause additional undesired fuel consumption or drag, the assistance propeller 4 is set to rest and retract into the main wing 2 as demonstrated in FIG. 17.

In FIG. 17 the assistance propeller 4 is set to rest and the entire assistance wing 3 is retracted forwardly partially into a respective space in the main wing 2. The assistance wing 3 now forms a portion of the main wing 2 and the propeller 4 becomes invisible and retained within the interior of the now main wing 2, which now consists of main wing 2 with assistance wing 3.

The assistance wings 3 may also be formed around a pipe structure 21,22,23. The pipe structures 21,22,23 may again partially or all of them carry hydraulic fluid to and from assistance propeller motor or drive means 7.

Drive means 7 or hydraulic motor 7 revolves the assistance propeller 4 and holds and carries it by a respective arrangement, for example a shaft and a flange.

In FIGS. 18 and 19 the main wing(s) 2 and/or the assistance wing(s) 3 are pivotally borne in a swing bearing or pivot bearing arrangement 14,15 or 24,25 respectively. The pivot arrangement may consist of a bearing housing 14 for main wing 2 or 24 for assistance wing 3 with a pivotable bearing body 15 therein for main wing(s) 2 and 25 therein for assistance wing 3. The bearing housings 14,24 may be borne on a respective portion of the body of the craft. The pivotable bearing bodies 15,25 may contain portions of the wing pipe structures 18 to 20 for the main wing 2 and 28 to 30 for the assistance wing 3. The pipes 18 to 20 and 28 to 30 may thereby extend through the pivot bodies 15 or 25 respectively, for example, in order to carry on one of their ends the respective fluid motor 4,5,16 or 26, to carry the wing(s) 2,3 and to have on their other ends the connecters to flexible fluid hoses to the respective pump(s).

FIG. 19 shows also, how the main wing 2 may be borne on a holder 111 which carries the bearing housing 14 above the cabin 1 of the craft.

In FIG. 18 the main wing 2 and the assistance wing 3 are pivoted in the respective bearing housing 14,24 to a suitable position for almost vertical take off and landing. The assistance propeller 26 therein is adding to a smooth flow of fluid over the main wing 2 to reduce the possibility of stalling. The main propeller in this figure is 16 as well as in FIG. 19. The assistance propeller in FIGS. 18 and 19 is propeller 26.

In FIG. 19 the locations of the pivot bearing housings 14 and 24 are the same as in FIG. 18 respectively to the body of the craft. Because the housings are preferred to be fixed on the body of the craft. Changed in FIG. 19 compared to FIG. 18, are the angles of inclination of the wings relatively to the horizon or flight direction of the aircraft. The change of direction of inclination of the wing(s) 2,3 is effected by pivoting the respective pivot body 15, 25 in the respective bearing housing 14, 24.

In FIG. 19 the wing(s) 2 and 3 now have the location and inclination suitable for forward flight. The assistance wing 3 still retains in the figure a slight inclination or angle of attack, slightly higher than that of the main wing 2. This is suitable to prevent stalling of the craft or to reduce the possibility of stall by the application of the assistance propeller 26 relative to main wing 2. Propeller 26 serves here to draw fluid over the main wing 2 whereby the possibility of stalling of the craft is reduced. When however the craft flies with high foreward speed, it may not be necessary any more to consider the possibility of stalling and the drag may become more important for consideration. The assistance wing 3 of FIG. 19 may then be swung or pivoted to a smaller angle of attack, for example to an angle substantially similar to that of the main wing 2 of FIG. 19.

The pivotion of the main wing 2 and/or of the assistance wing 3 may be effected in unison by a common controller if so desired. It is often however also at least temporarily suitable to control the angle of attack of the main wing 2 and of the assistance wing 3 individually. Especially when the craft nears the flight speed of forward flight or when the craft enters acrobatics, where the possibility of stalling could become possible.

In FIGS. 20 to 22 the wing or propeller has an outer skin 1. The main bone structure of the wing is provided by the at least three pipes 6,7,8 with interiors 9. They are extending longitudinally or in an inclination into the respective wing 1. Stabilizing ribs 11 are provided for form a rigid structure by the mentioned at least three pipes and the mentioned ribs. Further stabilizers 12 may be welded between the pipes and ribs. The outer ends of the pipes may be provided with holding plates 13 with plane faces to be adaptable to respective plane faces of a fluid motor 15. Holding means or bolts 14 may fasten plates 13 to the entrance and exit ports 17,18 of the fluid motor 15 in order, that fluid may flow flow to one or more of the interiors 9 of the pipes 6 to 8 into or out of the entrance or exit ports of the motor 15. Thereby the pipes are holding the fluid motor 15 and they are leading the driving fluid to the motor to revolve the rotor of the motor and they are leading the return flow away from the fluid motor 15. Shaft 16 of fluid motor 15 may hold and drive the respective propeller.

The inner ends of the pipes 6 to 8 may be bent to form bent inner ends 22. Thereby the pipes have only one single bending and they can be easily cleaned inside, whereby their interiors or passages 9 can be freed from dust and from dissettled or peeled off interior material portions after the welding of the ribs. As far as welding is mentioned here, other connections may be done, for example glueing or forming of the entire structure by fibres and resins. In order that the pipe structure can be borne on a body of the craft, it may be provided with holding pipes or holding portions 21 to extend in a direction commonly parallel or equal to the main extension of the pipes 6 to 8. They may however also extend under a relative inclination thereto. Since an aircraft has commonly a left wing and a right wing, the holding portions 21 are commonly in my invention welded to the pipes 6 to 8 of the right wing and of the left wing. Thereby they are forming a medial holding portion of the right and left wing of a common wing pair. These holding portions 21 may be utilized to form the pipes of the pivot bodies 17 or 27 of FIGS. 18 to 19 to have the left and right wing pivoted or be borne in holding bearing housing(s) 14 or 24 in unison.

The wing of this embodiment of the invention is also provided with airfoil-forming substantially vertical skin stabilizers 4 which are forming the outer skin 1 to the respective airfoil section, at least partially.

The stabilizers 4 may be provided with holders 2 to be fastened to the wing's skin 1. Additionally strong stabilizers or holders 3 may be added to permit the application of strong fasteners 5. For example, rivets or bolts 5. The holding portions 2 may be provided partially to the bottom portion and to the outer portion of the skin 1 of the wing. Skin 1 may consits of a single sheet 1 which is just laid around the stabilizers 4 to be fixed together on the rear ends of the wing skin, at location 20. Their fixing together may be done by glueing, or, as shown in the figure, by rivetting. The skin 1 may consists of a single sheet or of pluralities of sheets for example of metal like aluminium or of fibre sheets, for example, carbon fibre, while other suitable materials may also be used. The interior ends of the wing may be fastened to aircraft body 100. The inner ends 22 of the pipes 6,7,8 may extend into the body 100 of the craft. The vertical stabilizers or airfoil shape stabilizers 4 are provided with recesses 10 which are of such a size, that the respective pipes 6,7,8 can be extended through these recesses 10. It is preferred to make the recesses 10 of a bigger size than the outer diameters of the pipes 6 to 8. This prevents breaks by different heat expansions. The main holding of the wing is now done by the holding portions 2 and their fastening by fasteners 3,5 and by their fastening to the respective portions of the skin 1. The portions 2,3 permit according to their strength, a fastening of at least one of the pipes 6,7,8 to the holders 2,3 or 5. A second pipe of pipes 6,7,8 may be kept within a recess in the holding means 2,4,3,5. The arrangement 2,3,4,5 takes therefore over the duty to carry and hold the skin 1 on the pipe structure 6,7,8,11. Breaks are prevented by the sizes of the recesses 10 and by the suitable arrangement of parts 2,3,4 to hold even at different heat expansions of materials. It should be noted, that by the arrangements 2,3,4,5 a fastening of the commonly round or rectangular pipes 6,7,8 on the thin wing skin 1 is prevented. Skin 1 will therefore not be deformed by the pipe structure and thin or small fastening places are prevented. The wing of the invention thereby obtains a great strength at very small weight, even, when the outer skin consists of a single thin sheet of material and even, when it is laid only around the stabilizers 4 and kept together only at the rear end of the skin at location 20. Lateral escape of the wing can be prevented by fastening a portion of the wing to body 100 of the craft or by fastening members 2,3,4 or one thereof to the respective pipe 6,7 or 8.

FIGS. 23 to 27 demonstrate a craft which is capable to swim on water and to float above the water or even to fly through the air. Since it may be used as a pleasure craft on the beach, where also people swim in the water it is provided with several protection means or arrangements to prevent accidents by propellers.

It has a body 1 which contains the pilots seat or passenger cabin 2 and which may also contain the power plant(s) 4 with hydraulic pump(s) 4. On the end of the body 1 are the side rudder 5 and the elevators 6 provided. Laterally of body 1 are extending the right and left wings 7 and 8. The wings 7,8 may be provided with substantially vertically directed or inclined ducts 15 which may contain propellers 16 which are driven by fluid motors 17. Fluid motors 17 are driven by the pump(s) 4. Instead of using fluid motors 17, several arrangements 17 may consists of rotary transmission means to carry the rotary motion of the shaft of one fluid motor 17 to another or a plurality of other transmissions members 17. For example by chains, belts, rotary members with gears and the like.

Laterally on the right and left of body 1 but in a certain distance therefrom are the floating and driving arrangements 11,13 provided. The bottom portion is preferred to be a hollow room 13, see FIG. 26 to let the craft float on the surface of the water. Hull 14 may form the interior empty space 13 and closure device 25 may be provided to empty space 13 in hull 14 from non-desired matters. In the figures the forward driving engagement is contained in the second floor above the floating compartment 13. It forms a duct 11 to contain a driving means 9, for example, a fluid motor therein for the revolving of the forward drive propeller 10. Note, that the craft has such arrangements on the right and left wings 7 and 8. Protector ribs 12 are provided to prevent accidental entering of swimmers or of animals into the ducts 11. Accidents by living beings meeting the revolving propellers are thereby prevented.

The vertical or inclined ducts 15 are inclined to longitudinal or horizontal ducts 11 or are normally arranged thereto. To prevent accidents with the propellers 16 in the lifting ducts 15, the ducts 15 are provided with swing doors 21 on the bottoms of the durcts 15. Doors 21 are pivotable around the holding axes 22. Doors 21 may also be used to direct the direction of the leaving fluid streams from the propellers 16 and ducts 15 more or less downwardly or more or less to the rear of the craft to either lift the craft or to drive it forward and thereby to assist the action of the horizontal driving propellers 10 in ducts 11.

Figure 24:
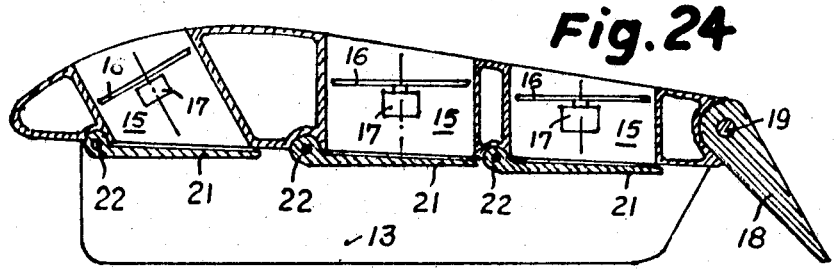
FIG. 24 is a longitudinal sectional view through a portion of FIG. 23.
Figure 25:
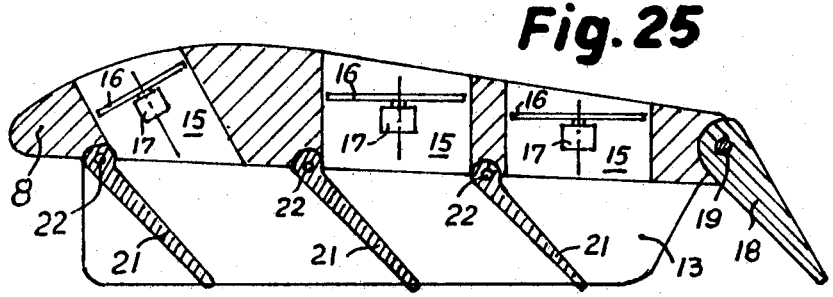
FIG. 25 is a view as in FIG. 24, however with a modification.
Figure 26:
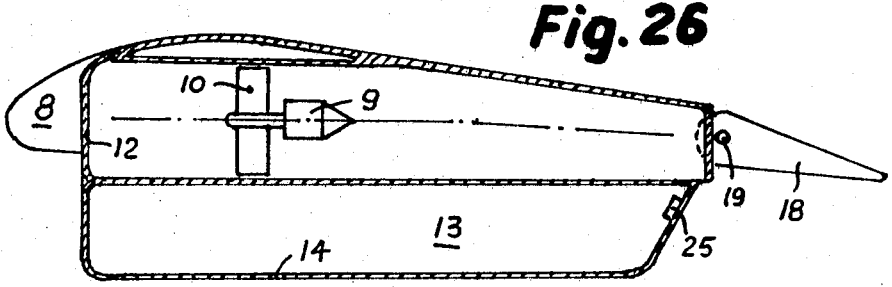
FIG. 26 is a longitudinal sectional view through a portion of FIG. 26.

On the rear of wings 7 and 8 are the swing plates 18 provided and pivotably borne on pivot bars 19. These swing plates 18 are serving to create below the wings 7 and 8 and between the body 1 and the floats 13,14 a lifting space 20. See FIG. 24. In this space 20 a pressure develops which exceeds the atmospheric pressure slightly, when the craft moves forward or when the vertical lift propellers 16 are revolving. The angle of inclination and the extension of size of swing plates 18 influence the pressure in the lifting space 20. When the craft obtains higher forward speeds, the swing doors 21 may close, as shown in FIG. 24. The closing of them may be done automatically by drag at forward speed and by stopping the lift propellers 16 in ducts 15. The craft as shown in FIG. 24 now floats above the surface of the water in the rolling air effect below the wings 7,8 and swing plate 18. This style of flight in a slight height of commonly less than a meter above the surface of the water can be obtained with less power, than the real flight higher in the air. At high speed forward flight, which requires a higher power supply, than the movement in FIG. 24 style, is shown in FIG. 26. The rear swing plates 18 are now directed more upwards to form rear extensions of the main wings 7 and 8. The lifting space 20 is now eliminated and the craft now flies on wings 7,8 with extensions 18, as a normal aircraft.

Figure 27:
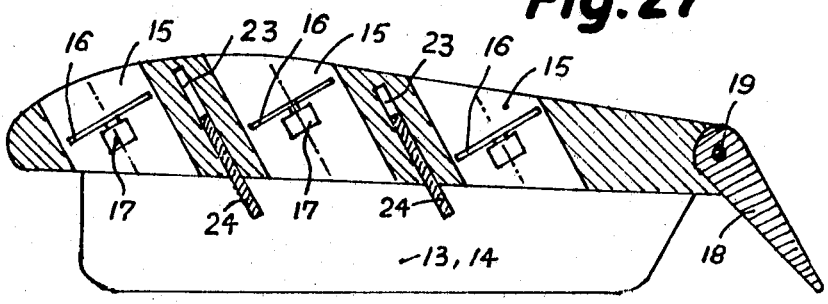
FIG. 27 is a longitudinal sectional view through a modification of FIG. 23.

FIG. 27 shows, that instead of using swing doors 21 it would also be possible to use slots 23 with retractable and extendable plates 24 therein to influence the lifting space 20 accordingly. The lower speed the craft has, the longer may the plates 24 be downwardly extended. The higher the forward speed of the craft becomes, the more may the plates 24 be retracted into the slots 23. Whether the lift propellers 16, drive means 17 and ducts 15 are provided or left away depends on the actual design case by case.

It is uncomfortable to have big diameter forward drive propellers 10 in a pleasure craft. However only big diameter propellers are effective at low speed. Where high take off speed is permissible, the lifting devices 15,16,17 can be spared. But where the craft shall move out of the water at very low forward speed, it is preferred to set and to provide them.

FIGS. 28 and 29 define a craft of the invention, which is simple and inexpensive and which is provided with an accident prevention device. The accident prevention device transforms the helicopter of these figures into a glider. By transforming the craft from a helicopter into a glider in accordance with this invention, the possibility of crashing of the craft after auto-rotation and failure of the landing maneuver out of auto-rotation is prevented. The craft therefore is more safe and can afford a gliding as a glider does. Thus, when all power plants of the engines fail or the driving of the propellers has otherwise failed, the craft does not need to crash but can fly on in the same style as a glider does. If the craft is heavy and the propellers are small, the gliding angle may however be of a steeper inclination than that of a high performance glider of the present time.

Body 1 carries the power plant and the transmission to the drive means 6 to revolve the plural helicopter propellers 7 on both sides of body 1. Body 1 also may be provided with a side rudder 11 and with wheels, skids or floats 21. As drive means to revolve the propellers 7 any suitable means may be applied, as described above. The propellers 7 might also be driven by individual power plants, which then must not be located in the body 1. I however prefer to have at least one power plant in body 1 to drive a multi flow hydraulic pump which leads through holders 2,3,4 fluid to and return from fluid motors 5. Each fluid motor 5 is driven by an individual flow of fluid and revolved with equal rotary velocity or with proportionate rotary velocity relative to an other one of the fluid motors 5. The propellers 7 are fastened to the revolving shafts 6 of the fluid motors 5 and they are driven thereby in normal multiblade helicopter flight. In the figures the rotary directions of the propellers 7 are however in the directions of the arrows in FIG. 28. This is important in this arrangement.

According to the invention, the propellers are on portions of their trailing edges of the chords provided with resistance providing drive bodies 8. They may be swing plates, as later will be seen in other figures. Normally the bodies 8 are parallel to the skin of the propellers and they are then almost not visible. They are then just a portion of the airfoil section of the propeller blade(s).

If now an accident occurs, that the drive means to drive the propellers 7 stops, the craft has still a forward flight speed. A means of the invention is then provided to open the bodies 8 and thereby to actuate them. The forward speed of the craft now acts against the bodies 8 at their respective backwards swings. See hereto the arrows in FIG. 28. The forward speed of the craft provides an airflow against the resistance bodies 8. See FIG. 29. The airspeed now acts against the bodies 8 and tries to run them along with the equal air speed, which the body 1 has relatively to the air. Since the bodies 8 are arranged closer to the centre of the propellers 7 than the tips of propellers 7 are, the propeller blades which are on the opposite sides of the centres of the propellers 7 in forward swing have tips which run with higher speed than the air speed is and than the bodies 8 are running. This higher speed of the outer portions of the propeller blades are now providing a lift. The lift may be almost as high as the lifting force was, when the propellers 7 were driven by the power plant. However that is the case only, when the craft maintains a high forward speed. The pilot will therefore try at such an emergency situation to run his craft of these figures with high forward speed. As for example was explained at hand of FIGS. 4,5. The faster the forward speed is, the higher becomes the rotary velocity of the propellers 7 and as smaller becomes the angle of inclination of the gliding flight. The bodies 8 of this present embodiment of the invention are thereby taking over the emergency propeller drive functions of the propeller sets 28,29 of FIGS. 4 and 5. A description of details of preferred embodiments of resistance bodies 8 are given for example in FIGS. 30 to 40.

In FIGS. 30 to 32 the free-wheeling arrangement or one-way clutch arrangement 9 is provided between shaft 6 and propeller centre housing 13. The propellers 7 have the resistance bodies 8. These are however in the radial inner or medial portions of the arms 7 of propeller 7 located. The resistance bodies 8 are serving as in the helicopter of FIGS. 28,29. The figures demonstrate the actuation of the resistance bodies 8. The resistance bodies may be plates 8. The resistance bodies are pivotably borne on a radially or substantially radially extending pivot bar 19 in propeller 7. Springs 20 may be provided to keep the resistance bodies 8 within the propeller biade airfoil section, for example in spaces 107. The bodies 8 are then fully retracted into the propeller blade, for example, as seen in the left portion of FIGS. 30 and 31. Shaft 6 is preferred to be stationary, while drive means 106 is driving the propeller 7, when the power plant operates. When the driving means 106 fails, the free wheel means 9 permits the revolution of the propeller 7 around the stationary control shaft 6.

Control shaft 6 is provided with a control cam 10. A radially moveable piston 12 is provided in a guide 14 and subjected to the spring 17 on holder 15 of piston 12. The spring 17 presses the control piston 12 radially inwards towards the centre of the propeller 7. The piston 12 has a top portion 16 which is preferably formed as a taper.

When the arm 7 of the propeller spins around, the inner end of piston 12 is freely revolving in the interior space or propeller hub in the centre housing 13. But when the piston 12 nears the control cam 10, and then moves over the control cam 10, the inner portion of piston 12 meets cam 10 and the piston 12 is thereby pressed radially outwards. Piston head 16 then meets the thrust portions 18 of the resistance bodies 8, presses against them and thereby with entering of the taper 16 into the thrust portions 18, the resistance bodies 8 are forced to open by swinging around the pivot axes 19. The blades or resistance bodies 8 are thereby spread outwards as long as the inner end of piston 12 moves over the stationary control cam 10. As this move over cam 10 is done, the springs 17 force the piston 12 back into the innermost position of rest; the springs 20 are forcing the arresting bodies 8 back into their innermost positions in the propeller airfoil, because the piston head moves away from the thrust portions 18 and out of the space between them. FIG. 32 is an enlargement of the section through FIGS. 30,31 respectively to show the details more clearly. The size, location and configuration of cam 6 thereby decides at which angles of rotation the resistance bodies 8 are in the innermost position in the propeller blade and thereby not effective and at which angles of rotation the resistance bodies 8 are moved partially or entirely into their outermost and thereby outer position, which is the position and location of extension out of the airfoil section of the propeller blade 7 and thereby the effective position which provides the drive for rotating the propellers 7 at forward flight speed in the gliding action of the craft, for example of FIGS. 28 and 29.

In FIG. 33 a modification of the arrangement to operate the resistance bodies 8 is demonstrated. Shown therein is the revolving medial portion 13 of propeller 7. It has cylinder 28 in the respective rotor blade 7 and a piston 29 loaded by a spring 30 movable in cylinder 28. The stationary shaft 6 is provided with fluid lines 24, 25 and fluid ports 26,27 of the fluid lines 24,25. During the revolution of the propeller the ports of the respective cylinders 28 are running alternately over the high pressure port 26 and over the low pressure port 27. When they run over the high pressure control port 26 the pressure in fluid forces the piston 29 radially outwards whereby its shaft 31 can take over the function of piston 12 of FIGS. 30 to 32. When the cylinderport moves over the low pressure control port 27, the spring 30 forces piston 29 back into its innermost location. Thus, when the port of the respective cylinder 28 moves over a high pressure port 26, the resistance bodies 8 are forced into their outermost and effective position. But when the respective port of the respective cylinder 28 moves over the low pressure control port 27, the resistance bodies 8 are returned into their innermost and ineffective position of location within the airfoil of the propeller blade 7. It is therefrom easily understood, that the location and size of the control ports 26 and 27 are defining at which angles or angular intervalls of rotation of the propeller blades the resistance bodies 8 are in their effective and in their ineffective positions.

Still a further modification to operate the resistance bodies 8 is shown in FIGS. 36 to 39 and a calculation is given in FIG. 40.

FIGS. 36 to 39 thereby demonstrate an arrangement to control the activity of the resistance bodies 8. Drive means, for example fluid motor, 5 may revolve the shaft 6 which holds the propeller 7. A free-wheeling arrangement may be provided in drive motor 5 or in the propeller centre portion 13. This embodiment of the invention now provides a control housing 50 with a piston 52 moveable therein. Spring 51 presses the piston 52 into the upwards position to engage and actuate the resistance bodies 8, for example, to engage their feelers 60,61 and press them upwards.

As long as however the motor 5 operates or the power plant of the craft operates, a fluid under pressure is led through passage 54 into the other cylinder portion 53 of body 50 onto the spring remote end of the piston 52 to force the piston 52 downwards and against the spring 51, thereby compressing the spring 51. When the power plant operates, the thrust portion 10 of piston 52 can thereby never meet the feeler 60,61 of the resistance body 8's control arrangement. The resistance bodies 8 are thereby automatically and at all times remaining in their innermost and ineffective positions of location within the airfoil section of the respective blade 7 of propeller 7. This innermost or ineffective location of the resistance bodies 8 is clearly demonstrated in the enlargement FIG. 37 of the cross-sectional view through the propeller along the right arrow in FIG. 36.

When now however the power plant fails to operate, or, when the Oilmotor or fluid motor 5 fails to get oil under pressure or fluid under pressure, there will also be no pressure in the fluid in fluid passage 54. The spring 51 then immediately presses the piston 52 upwards in control housing 50, whereby the upper control end 10 of piston 52 enters the location of the feeler 60,61 of the resistance body operation arrangement. FIG. 39 shows the control end of piston 52 in a greater scale. Thereby it is also shown, that the piston end 10 may carry a control cam 55 with a guide face 56 of a specifically curved configuration. As soon as the pressure is lost in passage 54 the control face 56 is now within the defines of movement of the feelers 60,61 of the control arrangement to control the operation of resistance bodies 8. The feelers may consists of a swing arm 59 with rollers 61 borne on an axis or bar 60. When the rollers 61 are rolling the control or guide face 56 of cam 55, the swing arm 59 becomes angularily pivoted around its pivot bar 57. Pivot bar 57 may be borne in bearings 58. FIG. 39 is thereby principally a section along the left arrow in FIG. 36. Pivot bar 37 extends radially in the propeller arm 7 towards the location of the right arrow in FIG. 36 and is therefore also visible in cross-sectional FIGS. 37 and 38. So are the bearing members 38. The pivotion of bar 37 by the rolling of feeler rollers 61 over the guide face 56 brings the cam(s) 110 in FIG. 38 into engagement with the thrust portions 118 and 218 of the resistance bodies 8. Thereby the resistance bodies 8 are pivoted around their pivot bars 63 into the outer position outwards of the propeller blades airfoil section.

FIG. 38 shows the resistance bodies 8 in their outermost or effective location or position.

FIG. 37 shows the resistance bodies 8 in their inermost or ineffective position within the airfoil of the prppeller blades.

When the feeler roller 61 has departed from the guide face 56 of cam 55 of piston 10, the swing arm 59 moves down again and the resistance bodies 8 are returning under the force of closing springs 65 into their innermost and ineffective location and position inside of the outer configuration of the airfoil of the propeller blade. The guides 62 may be provided in the airfoil or propeller blade to hold the resistance bodies 8 in their innermost positions. The resistance bodies 8 are then forming, as seen in FIG. 37, a portion of the airfoil shape of the respective propeller blade 7. Pivot bars 63 may be borne in bearings 64. As soon as the power plant works again, the pressure in fluid in the fluid will enter into space 53 and press the piston head 10 downwards together with piston 52 in control housing 50. The arrangement 50,10, 55,56 can then not interfere any more with the feelers 59,60,61 and the resistance bodies 8 are remaining in their innermost and ineffective locations of FIG. 37 inside of the airfoil-section of the propeller blade. It will be easily understood from this explanation, that the location and size as well as confugration of the members 55,56 in combination with the entire arrangement will strictly define at which angular intervals of revolution of the respective propeller blade 7 the respective resistance bodies 8 are in the effective or in the ineffective position and location.

FIG. 40 gives a mathematical explanation in relation to FIG. 36, at which distance from the centre axis of the propeller 7 the resistance bodies 8 should be located. This distance is "A" and a mathematical relationship to the distance "B" of the concentrated medial calculation point of the propeller arm. "Eta" in the final equation of FIG. 40 demonstrates the losses which will appear and "Vo" is the forward speed of the craft. The resistance bodies 8 would provide the speed "Vo" to arm length distance "A", if the arrangement would be hundered percent effective, whereby "eta" would be "1". The lift of the propeller arm would then be:

$$L = (F_L/2)C_{LL}(\rho/2)(2A\pi\eta/60)^2$$

or:

$$L = (F_L/2)C_{LL}(\rho/2)[(F_L C_{WL}/F_R C_{WR})B^2/\eta]$$

When calculating the lift of the propeller arm through by the above equations, it will be found, that at high forward speed "Vo" of the craft the lift of the propeller arm remains considerable and the propellers are thereby capable of bearing the craft in a gliding flight under a certain inclination towards the ground. The pilot will have time to look for a suitable emergency landing place and be able to afford an emergency landing with the comfort of less risk of failure than with autorotation flare out of a helicopter.

In the above equations the drag factor Cw of the resistance body 8 is much higher, than the drag factor of the opposite propeller arm. For example, the drag factor of resistance body 8 may be about "Cw" = 0.8 to 1.1:

while the drag factor of the opposite propeller blade may be about "Cwl"=0.02 to 0.10. In the difference of the drag-factors the basis is given for the working effect of the arrangement of the resistance bodies 8 to drive the revolving of the propellers in accordance with this embodiment of the invention.

FIG. 41 demonstrates another system of the invention for automatic transformation of the craft into a glider, where the main engine(s) fail or the driving system fails. The craft shown therein has at least two propellers with substantially horizontal axes and at least two propellers with substantially vertical axes. The propellers 6 and 7 with the substantially vertical axes are carrying the helicopter in the air. The first propeller 28 with the substantially horizontal axis is driven by the main power plant. This may be plant 8 or a plant in body 1 which transmits the power over or along holders 123,124 to the drive means 8 of propeller 28. The power-driven first propeller 28 creates an airstream which drives the helicopter forwards and which is directed towards the second propeller 29. This airstream is revolving the second propeller 29 with the substantially horizontal axis substantially as if it would be the propeller of a wind mill. The airstream-driven propeller 29 revolves over a holding arrangement 123,124 with a transmission portion 8 over further transmission portions 70,71 the transmission portions 107 which bear and revolve the propellers 7. In other words, the power-operated propeller 28 creates the airstream which drives the airstream driven propeller 29, while the airstream power which operates the airstream driven propeller 29 also operates and drives the carrying propellers 7 of the helicopter with body 1. Such style of operating and driving the carrying propellers 7 of the craft is not very economic, because it has losses at many places. For example losses of power in the first propeller 28 when this propeller creates the air stream; further losses in the second propeller 29 when the airstream drives this propeller, and further losses in the transmission between the second propeller 29 and the carrying propellers 7.

However, the arrangement of this embodiment of the invention is a very safe system of flying. It is especially convenient for beginning flyers. Because it provides an automatic gliding of the craft to the ground, when the drive means of driving the power driven propeller 28 fails. Because, when the propeller 28 fails and comes to rest, an automatic device, depending on the power supply, will shift the gravity centre of the craft from location 72 to location 73. The craft which before had the location parallel to line 74 will thereby get the inclination parallel to line 75. This is the angle of gliding of the craft. The craft continues to glide forwards along the path parallel to dotted line 75 and thereby has enough forward speed to continue to drive the second propeller 29. Because since propeller 29 moves through the air forwardly it is the similar effect as if the first propeller 28 would blow an airstream towards the second propeller 29. Propeller 29 therefore continues to revolve and continues to drive the lifting propellers 7 which carry the craft. No operation of the pilot is required because the transformation from powered flight to powerless gliding occurs automatically. The craft therefore provides greater safety for a chance of a successful emergency landing. The possibilities of crashing at landing are not much greater than those of a glider plane. Quite naturally, the angle of attack especially of propellers 28,29 and 7 must be made suitable and so must be the diameters in order that propeller 29 has the capability to drive the carrying propellers 7.

FIGS. 43 and 44 demonstrate a still further embodiment of a selftransforming helicopter-glider of the invention. Body 1 of this craft has at least two propellers 16,17 which are borne on pivot members 15,25 or pivot bodies 15,25. The bodies 15,25 have holding provisions 77 and the body 1 has second holding provisions 76. An automatic element 78 has third holding provisions 82 on the ends of the element. The element 78 is basically a cylinder and has therein a reciprocable piston 79 with a spring 178 on one end thereof and a pressure chamber 81 on the other end thereof. An entrance 80 permits a pressure fluid to enter into chamber 81. One holding provision of the third holding provisions is on the cylinder 78, the other on the piston 79. The automatic elements 78 are mounted with their third holding provisions to the first and second holding provisions 77,76 of the pivot bodies 15,25 and the body 1. The automatic element 78 thereby pulls the right arms of the propellers 16,17 downwards, whereby the left or front arms of the propellers are pivoted upwards. The entrances 80 of the automatic elements 78 are communicated to a fluid pressure pump of the power plant. The power plant also is provided with transmission means or power transfer means to revolve the propellers 16 and 17. When the power plant gives enough power supply, the propellers 16 and 17 are revolving and the fluid which enters into the space 81 in the automatic elements 78 now compresses the springs 178 and moves the pistons 79 upwards. Thereby the right or rear sides of the propellers 16,16 are moved upwards, whereby the left or front arms of the propellers are inclined downwards. They now have the positions as in FIG. 42. The pivot bodies 15, are thereby pivoted in their bearing bodies or bearing housings 14,24. The craft is now lifting upwards and flies forward under the forward inclination of the propellers 16 and 17. When now in flight the power plant fails, or the drive means to revolve the propellers 16,17 fails, the pressure supply into space or chambers 81 of the automatic element 78 fails also. The springs 178 are now pressing the pistons 79 inwards, whereby the rear portions of the propellers 16,17 are pulled downwards and the front portions are pulled upwards to obtain the positions of FIG. 44. The helicopter is now a gyrocopter and glides under an angle 84 downwards to the ground. Respective automatic drive means with forwardflight response, like resistance bodies 8 of FIGS. 36 to 39 or the like might be added to the propellers 16,17. Thereby also this craft assures a gliding forward flight under inclination 84 to the ground.

FIGS. 34 and 35 partially also FIG. 33 demonstrate an auto-rotation actuation device of the invention. It may be actuated by a control action of the pilot. I prefer however the automatic actuation, when the power suplly device fails. According to this embodiment of the invention the propeller blade 77 is provided with a swing portion or extension portion 7 and/or 39. The second-left bottom portion of FIG. 35 shows the propeller 7 in the normal form. Contrary thereto the rightmost figure on the bottom of FIG. 35 shows the propeller portion 777 in a pivoted angle and with extended extension blades 39. The usual form of the mentioned second-left figure is usually fixed and non-changeable. The variable or pivot portion 777 is pivotably borne in bearing 45 of the propeller blade. For automatic actuation of the auto-rotation of the propeller, the medial propeller portion has a fluid supply line 22 which continues as fluid line 23-25 towards a chamber 33 in a cylinder arrangement 32 with a reciprocable piston 34 therein. The opposite end of the piston 34 is loaded by a spring 30. Spring 30 presses the piston 34 with piston shaft 36 thereon rightwards in the figur, or, for example, outwards in the propeller arm. Piston shaft 36 has swing connectors 37 with respective connection arms 137 which are connected by connectors 38 to extendable blades 39. The blades 39 are guided in a slot 40. When the spring 30 presses the piston 34 outwards, the linkages and connectors 37,137,38 are pressing the extensions or blades 39 outwards in guide slot(s) 40. Piston shaft 36 has in the figure also a pivot-arrangement portion or guide arm 44. Arm 44 extends through a recess 42 in the inner bearing body into an inclined pivotion guide recess 43 in the propeller arm. The movement of arm 44 in the inclined guide slot 43 provides a pivotion of the pivot portion 777 in the propeller arm 77. When the piston shaft 36 moves leftward under a fluid force in chamber 33 against the spring 30, the pivot portion 7 pivotes into the position of equality to the propeller blade, namely into the direction of blade portion 7,77 of the second-left bottom portion of FIG. 35. When the piston shaft 36 moves to the right in the figure, the guide slot 43 with finger 44 therein pivots the pivot portion 777 into the position of the rightes bottom portion of the figure. FIG. 34 shows the propeller arm seen from front or rear. When no fluid pressure is in chamber 33, the pivot portion 777 has at all times the location or position of the rightmost bottom portion of FIG. 35. This is the auto-rotation position. If however the power plant supplies power to revolve the propeller(s), a fluid pump, driven by the power plant supplies a fluid under pressure to passage 22. From there it is passed through passages 23,35 into chamber 33 in cylinder 32 to compress the spring 30 and thereby to retract the piston arm 36. At this retraction, the finger or feeling arm 44 slides in recess 43 and thereby pivots the pivot portion 777 into the normal position of the angle as in the second-left bottom figure. At same time the retracting piston shaft 36 retracts over arrangements 37,137,38 the extensions or blades 39 fully back into the guide slot or holding slot(s) 40. The pivot portion 777 has then become a normal propeller portion as that in the second left bottom figure and acts as a usual propeller-portion.

If however, the power supply fails, the fluid pressure in passage 22 also fails. The pressure in chamber 33 fails also and the spring 30 acts as usual, namely by pressing the piston 34 outwards to pivot the pivot portion 777 of the invention into the angular direction of the rightest bottom figure, while at the same time the extensions 39 are moved outwards into the outermost extended location.

The craft now starts to decend. The pivoted propeller-portion 777 is now in an airstream from the left to the right in the bottom FIG. 35. Actually it sinks in the air and the arrangement is 90 degrees turned in actuality. The pivoted portion together with extensions or blades 39 now provide a big resistance against the air. The almost rectangular angle with only slight inclination relatively to the right angle to the air forces the pivoted portion 777 to move with a high speed in the direction of the arrow of FIG. 35. The force of the air onto the pivoted portion 777 is very high, because the "Cw" factor of drag is almost "1", and the area with the extended blades 39 is great. The mentioned force is thereby able to force the propeller to revolve. The rest of the propeller, the normal propeller then continues to act as a typical helicopter propeller and carries the craft down to the ground with a certain speed of descent. The speed of descent depends on the sizes, angles of the arrangement of the invention and of the size and angles of attack of the rest of the propeller blade(s) which revolve in this state of auto-rotation by the pivot portion 777 of this embodiment of the invention.

FIG. 45 demonstrates in its figure portions A to D still another arrangement of the invention for the automatic provision and actuation of the auto-rotation of a helicopter blade when the drive means to drive the blade fails. The propeller arm 2 is provided with a reception space 1. A support member 1 is located in the reception space 3. Support member 1 may be borne by the shaft 10 of the propeller. Support member 1 forms a preferredly tapered thrust portion 21, while a complementary thrust portion of preferredly opposite and diametric tapered form is formed by 12 in blade 2 on reception space 3. The reception space 3 contains also a cylinder 5 with a one-end spring loaded reciprocable piston 6 therein. The piston shaft 6 carries on one of its ends a thruster 4 of preferredly also tapered configuration for possible fitting and thrusting into the space between the mentioned thrustportions 12 and 21. In the position of rest, which is also the position for auto-rotation of the propeller blade(s) 2, the piston 6 is pressed by spring 7 into the cylinder 5 for the innermost position therein. The thruster 4 is then remote from the thrust portions 12 and 21. The propeller has now the angle of attack suitable for auto-rotation. This angle is commonly about 4 to 12 degrees smaller than the angle of attack for flight as a helicopter. Figure portions C and D are sections along the arrowed lines of figure portions A and/or B. Figure portion D shows the cross-section of the propeller blade 2 in helicopter flight position with angle "alpha" the angle demonstrated under portion D. Figure Portion C shows the usual or resting position of the propeller blade 2, which is also the auto-rotation position with angle of attack "beta", (see the angle "beta" under the figure portion "C").

The propeller is usually under the portion "C" of angle "beta". When however the power plant starts to supply enough power, a fluid pump driven by the power plant of the craft supplies a fluid under pressure through the passage 9, which may be set through the propeller bearing shaft 10 into the chamber 8 in cylinder 5. This pressure in fluid compresses the spring 7 and moves the respective piston(s) 6 outwards in the respective cylinder 5 into the outermost position. Thereby the thruster 4 on the other end of piston or piston shaft 6 moves into the clearance between the thrust portions 12 and 21 of the support member 1 and of the reception space 3 of blade 2. Thereby thruster 4 presses the thrust portions 12 and 21 away from each other. The propeller blade 2 is of slightly deformable material, like for example, aluminium or carbon fibre and the blade portion between centre 11 and thrust portions 12 and 21 has no other choice, but to deform slightly under the thrust of thruster 4 to obtain the position of figure portion "D" of angle of attack "alpha" for flight operation as a helicopter. Thus, as soon as the power plant supplies enough power, the rest of the propeller blade is tilted into the helicopter operation position of figure portion "D" and this effect is appearing automatically. The helicopter is ready to start and to fly. As long as the power plant supplies enough power, the pump maintains the pressure in chamber 8 and the propeller blade's main portion maintains the position "D" of helicopter flight operation. When however the engine or power plant fails, for example during the flight of the helicopter, the pump also fails to supply the fluid into chamber 8. The spring 7 then presses the thruster 4 away from the thrust portions 12 and 21 because it presses the piston 6 inwards to the innermost position, the position of rest. The thrust portions 12 and 21 can now move towards each other again and they do so under the tensile strength of the propeller blade portion between parts 11, 12,21, because the spanned stress in this blade portion now automatically forces the blade 2 back into the free, resting and not twisted or stressed position of rest and of auto-rotation of figure portion "C". The helicopter will now descend in auto-rotation as a usual helicopter. However, the change from flight to auto-rotation has been accomplished automatically with the arrangement of this figure of the invention. The invention has thereby freed the pilot from any action for change of flight to auto-rotation. The craft which is provided with this embodiment of the invention has thereby obtained an additional safety.

FIGS. 46 to 48 demonstrate another sample of an embodiment of the invention for the provision of an automatic auto-rotation to a helicopter blade or to helicopter blades. This embodiment of the invention can be provided to existing propeller blades of helicopters, when the blades are made of slightly flexible materail for example of aluminium, Kevlar, Carbon fibre or the like. A holder 1 becomes fastened around a portion of the propeller blade 2. It may be fastened by holders 12. Holder 1 has a holding bar 3. The medial propeller portion 11 becomes provided with a second holding bar 4. A cylinder 5 becomes pivotably fastened with its end to holding bar 4, while the reciprocable piston 6 of cylinder 5 becomes fastened with the end of its shaft 7 to the holder bar 3 of holder 1. A fluid line 9 becomes provided and connected to a fluid line which is not shown in the figure to transfer fluid by a communication to entrance 8 of cylinder 5 into the outer chamber 55 in cylinder 5. The fluid through passage or fluid line 9 is supplied from a pump, which is driven by the power plant of the craft. It has a pressure overflow or relieve valve for safety to prevent too high a pressure in fluid line 9.

Usually there is no pressure in chamber 55 of cylinder 5. The piston 6 is without load. The outer portions of the propeller blades 2 have the position of rest or of auto-rotational angle, as in figure portion "C" of FIG. 45.

When however the power plant starts to supply enough power to revolve the propeller blade(s) 2 with enough rotary speed, the mentioned pump starts to supply a fluid under pressure to fluid line 9. This fluid moves under this pressure into chamber(s) 55 in cylinder(s) 5 and presses the piston(s) 6 inwards in the cylinder(s) 6. Thereby the distance between the holder bars 3 and 4 shortens. The portion of the proepller blade 2 between holders 1 and the medial portion 11 has now no other choice, but to transform under stress from the resting position of FIG. 45-C into the helicopter operation position of FIG. 45-D. This position is maintained as long as the power plant operates and the helicopter flies under power. When however the power plant fails to supply enough power, for example in flight, by accident, the pressure and fluid in line 9 disappears and it also thereby disappears in chamber 55 of the respective cylinder 5. The blade 2 re-forms under its stress in the portion between 1 and 11 to the position of rest and of auto-rotation of FIG. 45-C. The helicopter now descends to the ground under autorotation of the propeller blades(s) 2.

Again, the change from power flight to power-less auto-rotation of the propeller(s) of the helicopter has become accomplished automatically and without a pilot-action by the embodiment of the invention. FIG. 46 shows the propeller portion from the top. FIG. 47 shows the position of FIG. 46 seen from in front and FIG. 48 is a cross-sectional view through FIG. 47 along the arrowed line of the figure. Shown in FIGS. 46 to 48 is also the layerbody 10, which may be laid between the cylinder 5 and the surface of the blade 2 in order to assist the bending action of the piston 6,7. Seen is also in the mentioned figures, that the holder bar 3 of the holder 1 may be located in the front portion of the blade, while the holder bar 4 should be located in the thereto relatively rear portion of the medial portion 11 of the propeller 2. This location assists the easy deformation or bending of the propeller blade from resting or auto-rotation position 45-C to the helicopter operation position 45-D.

FIG. 49 demonstrates, how I prefer to build my propellers, when they shall be of extremely light weight, but still of great strength. I apply a basic first sheet of metal of fibre, like aluminium or carbon fibre or other suitable material and form it in its length as shown in portion D of the figure. A second sheet of material is formed in the cross-section as shown in portion E of the figure. The second profiled sheet 3 is then inserted into the first profiled sheet 1. It may be rivetted, bolted, or glued to sheet 1, as shown in portion C of the figure. Thereafter portion 11 of profile sheet 1 is bent over profile sheet 2 and glued, rivetted or bolted or otherwise fastened with its end 4 to the other end of the first profile sheet 1. This propeller blade or wing of an aircraft, because this system is not only useable as propeller blades, but also as wings for aircraft, is now visible in portions B and C of the figure. FIG. C is thereby a cross-sectional view through portion B of this figure.

Portion F of the figure demonstrates, that still a greater strength can be added to the wing or propeller arm, by the insertion of a third profile sheet 12. This sheet is cut or formed to the upper portion of portion F of the figure. It is thereafter bent to plane portions and inclined portions, which are visible in the bottom figure of figure portion F. The third profile sheet 12 is then fastened into the space between the medial portions 6,7,8 of the second profile sheet 3. Fastening portions 16 may be formed on the inclined portions 14 and 16 of the third profile sheet. They may be bent to fit along the inclined face portions 6 or 8 of the second profile sheet 3. After the third profile sheet 3 is inserted into the space between the medial portions 6,7,8 of the second profile sheet 3, the portions 15 of the third profile are fastened to the medial portion 7 of the second profile sheet 3, while the bent fastening portions 16 of the third profile sheet 12 are fastened to the inclined medial portions 6 and 8 of the second profile sheet 3. The fastening is preferredly done by rivetting or by glueing. With this work done, the medial portion of the second profile sheet 3 is much strengthened and the combined profile sheets 2 and 3 give a rigid structure as shown in figure portion E. The rearward extension 5 of the second profile sheet 3 is formed to fit along the bottom portion 1 of the first profile sheet 1. The forward extension 9 of the second profile sheet 3 is also formed to fit along the respective portion of the bottom portion 1 of the first profile sheet 1. Portions 5 and 9 of the second profile sheet 3 are then fastened to the bottom portion 1 of the first profile sheet 1. The plane portions 13 of the third profile sheet 12 may also become fastened to the bottom portion 1 of the first profile sheet 1 if so desired. The forward extension 9 of the second profile sheet 3 may form on its outermost portion a configuration 10 to fit into the bend portion 2 of profile sheet 1 of figure portion D and it may be fastened thereinto. The feature of this arrangement is first of all the obtainment of a great rigidity and strength at very low weight and low cost. But another feature of the arrangement is also, that all described profile sheets can be cut by single cutting steps to proper profile and size under a respective press. And, which is very important and convenient, the insertion of the third profile sheet into the second profile sheet can be done under a press in respective forms, whereby it becomes easy and possible to glue the sheets properly together or to rivett them without movement of the sheets relatively to each other and without any space between them at their respective adjacent faces. In the same way, the portions 5 and 9 of the second profile sheet 3 can be pressed under a form press onto the respective portions 1 of the first profile sheet 1 and thereby glued together under pressing action or respectively rivetted together. When the combined second and third profile sheets 3 and 12 are fastened to the bottom portion 1 of the first profile sheet 1, the curved front portion 10 of the second profile sheet 3 is also inserted into the inner wall of the curved portion 2 of the first profile sheet 1 and fastened thereto if so desired. It is now easy to press the upper portion 11 of the first profile sheet 1 downwards until it meets the medial upper portion 7 of the second profile sheet 3 and until the outermost end portion 4 of the upper portion 11 of the first profile sheet 1 comes to lay and rest on the outermost end portion 4 of the first profile sheet 1. Here the ends 4 of profile sheet 1 are then either rivetted together by rivets 17 of figure portion B, bolted together there to replace the rivets 17 or the end portions 1 of the first profile sheet 1 are glued together by the then innermost and adjacend faces of the end portions 4 of profile sheet 1. The combined ends 4 of profile sheet 1 are now forming the trailing edge of the propeller arm or of the aircraft wing. The three profile sheets, the first profile sheet 1, the second profile sheet 3 and the third profile sheet 12 are shown in the longitudinal sectional view of figure portion A of figure 49. Seen therein is also, how the plane portions 7 and 15 are laying on the upper portion 11 of the profile sheet 1 and how the plane portions 13 of the third profile sheet 12 may lay on the bottom portion 1 of the first profile sheet 1. The figure portion A has a left and a right portion, whereof the left portions shows the sectional view through figure portion E along the arrow A—A and the right portions shows the view through figure portion E along the arrow B—B. Therefore, in the right portion of portion A of FIG. 49 shows also, how the portions 5 and 9 of the second profile sheet 3 will lay on the bottom portion 1 of the first profile sheet 1.

Since the first profile sheet 1 has a certain strength and resistance against deformation itself, the arrangement of FIG. 49 is in may cases satisfactory for low loaded propellers or aircraft wings. Instead of providing a single third profile sheet 12, it is also possible to insert single or individual tapered sheets 14 with or without extended plane portions or curved portions 13 or 15 into the medial space between portions 6,7 and 8 of the second profile sheet 3. When however specific higher resistance of the profile sheet 1 against deformation under heavy relative air speed or load is required, respective fourth and or fifth profile sheets may be inserted into the chambers 25 and/or 26 of the wing or propeller arm of FIG. 49 or 50.

FIG. 50 demonstrates how the flap or resistance body 88 might be assembled to the wing or propeller arm of FIG. 49. The resistance body or drag-flap 88 may correspond in principle to the resistance body 8 of FIGS. 28,29, or 30 to 32. Instead of providing two flaps 8, the FIG. 50 shows, that sometimes it might also be enough to provide a single resistance body or drap flap 88. The figure shows such single flap 88. But it could also be provided with two or more of such resistance bodies or drag flaps 8 or 88. Drag flap 8 of FIG. 50 has an inner portion which forms a pivot bearing portion 21. It is laid around a pivot bar 20. Pivot bar 20 is fastened by extension through tapered portions 14 of FIG. 49 in these tapered portions 14 in FIG. 50. Instead as shown in the figure, the flap 88 may also use a bar 20 as the inner bearing portion, while the wing's profile sheet or sheets may hold the pivot bearing(s) 21. Any other suitable arrangement is also permissible if the rules of the invention are obeyed. Resistance flap 88 may have as its outermost portion of the rear portion 4 to be laid onto the respective portion 4 of the rear portion of the inner portion of the first profile sheet 1, when the flap 88 will be retracted into the wing or into the propeller's arm. Bearing faces 11 may be provided in the arrangement to give support to the flap 88, when it retratcts into the wing or into the propeller-arm.

Regarding FIG. 49 it is also of interest, that the replacement of the inclined portions 14 of figure portion "F" by inclined and bowed portions 24 of figure portion 49 "G" would still further increase the strength, if such portions are fastened into medial space between 6,7 and 8 of the second body 3 or into spaces 25 or 26 of the propeller arm or wing of FIG. 49.

FIG. 51 shows a longitudinal sectional view through an automatically acting overflow valve. This valve is preferred to be used in machines which use gases as an operating fluid and liquids or other gases as a lubrication fluid. For example, in a combustion engine air or burned gases are used, to operate the device or to be handled in the device. Such gases are commonly not good for sealing and/or lubrication. Liquids, for example, oil, are better for such lubrication and/or sealing purposes. But on the other hand, the periodically changing pressures in the operating gases are required for balancing purposes in some devices of my invention(s). The operation fluids and the lubrication fluids should not mix with one another. Body 1 of the valve of this embodiment of the invention therefore has a chamber 4 with two axially moveable bodies 5 and 10 therein. The first body 10 is a thrust body and it is subjected to the lubrication fluid in chamber 14. The lubrication fluid, which may also act as a sealing fluid, is led from a supply source through passage 9 which should mostly contain a one way check valve 8 into the first chamber 14. This lubrication fluid presses from chamber 14 the thrust piston 10 against the face of the means to be sealed, for example, against body 13. The working gas pressure is led from the working place, for example from the compression or expansion cylinder of a gas-handling device into the chamber 4. Body 3 may close chamber 4 in the outward direction. The gas or fluid may be passed through passage 2 into chamber 4.

Thrust body 10 may be provided with a passage 11 to communicate the chamber 14 with a fluid pressure pocket 12 in the other end of thrust body 10. A sealing land(or lands) surround the pocket 12 to prevent escape of sealing fluid thereout. The sealing land is complementary configurated respective to the seal face of the body, for example 13, wherealong it shall seal and thrust. The sealing fluid which is led through passage 9 into chamber 14 and into fluid pressure pocket 14 acts therefore with a respective pressure in pocket 12. This pressure would however likely be the constant pressure of the supply arrangement. But the gas pressure would change periodically often drastically and quickly. The valve of the invention is therefore provided with an overflow arrangement which is a chamber 6 with an outlet 6. When the seal fluid pressure become periodically higher than the gas pressure, the separation piston 5 moves upwards in chamber 4 and opens chamber 14 to exit chamber 6. The seal fluid flows along the bottom of piston 5, which separates the both fluids, into the outflow or overflow arrangement 6. As soon as the gas pressure in chamber 4 becomes higher, the seal piston 5 moves downward again and closes the overflow chamber 6, whereby chamber 14 is closed again. The arrangement may for example, be used for sealing of the arrangements of the invention, for example of rotary valves, pistons or piston shoes of the combustion engines and like of the application. It perfectly supplies the pressure of the gases into the seal fluid containing fluid pressure pockets.

FIG. 52 gives simple calculation formulas for a number of configurations of propellers. These calculations are first estimates and do not claim absolute accuracy. However, the accuracy appears to be close enough for first estimates of the resistances, which are also called drag(s) and for the torques of the respective propellers. Therefrom also the integral medial radii can be found and the power(s) required. These formulas are for example very helpful to design the resistance or drag bodies or flaps 8,88 of the invention, to change a helicopter into a glider, when the engine('s) or power supply(ies) fail. They are also helpful for the calculation of the blades of helicopters generally.

FIG. 52 explains, how I have developed the equations of FIG. 53. Since everything in FIGS. 52 and 53 is written in strictly useable mathematical terms with defined technological sizes and configuration(s), the FIGS. 52 and 53 are self-explanatory and do not require any further description here. If further information is desired, the inventor might be contacted at his permanent residence, which will appear on the applied for patent. It is recommended, to calculate the respective propeller for 1000 RPM. Any other values for other RPM can then be found by multiplying the obtained value with the 2nd power of the fraction (RPM/1000, namely by: $(RPM/1000)^2$.

FIG. 54 explains the basic values of the physics involved with helicopter propellers. FIG. portion "B" explains the propeller with its medial chord "B" and with its integral medial resistance and torque responsive integral radius "R". This integral medial radius is 0.7 in blades with equal chord "B" but it reaches higher values, for example at up to higher than 0.77 in the propeller types 3 of FIG. 52. FIG. portion "C" shows the airstream through the propeller, wherefrom the equations and novel results of my co-pending patent application 229,910 are arrived. Figure portions "D" and "E" demonstrate how the situation of figure portion "A" is changing, when the axis of the propeller is inclined. "D" shows the range of economic helicopter flight, where the power required is less than in hovering, while portion "C" shows an uneconomic speedy flight range, where the power required is higher than in hovering and much higher than in the economic flight of "D" at lower speed. For the calculation of the propeller usually the angle of attack "delta" of figure portion "A" is to be used. Since however, the propeller at hovering or at vertical flight must also accellerate the airstream of figure portion "C", the propeller will at this stage have to use the angle of attack "alpha". The angle of attack "beta" is then the angle of attack required to accellerate the airstream of figure portion "C". This angle of attack and this power required thereby is commonly much higher, than the angle of attack "alpha" and the power required by it.

When however the helicopter flies forward with a certain forward speed "Vo" the propeller moves out of the downward airstream of figure portion "C" whereby the angle of attack required reduces to "delta". The power required is then drastically reduced and the economic flight range of figure portion "D" is obtained. When a constant pitch of angle "alpha" is used, the RPM of the propeller can be and will be respectively reduced, whereby the power requirement reduces.

FIG. 55 explaines, that the rear propeller might still be partially or entirely in the downwash airstream of FIG. 54,C, when the front propeller has already left it. When deciding the medial forward speed of the helicopter, this fact should be considered. For example, by adjusting the propeller accordingly, for example, by other angles of FIG. 54,A, than the front propeller. To have an impression of the change of power in forward flight I have considered the movement of the respective propeller out of the propeller downwash airstream of portion "C" of FIG. 54. FIG. 65 demonstrates the power consumption of a propeller at different angles "gamma" of inclination of the propeller axis in accordance with my estimate-calculation. For more excact details the inventor may be contacted at his residence.

What is claimed is:

1. An aircraft having a body with a longitudinal imaginary vertical medial plane through said body and a pair of first wing portions extending laterally from said body, one wing of said pair in one lateral direction of said plane and the other wing of said pair extending symmetrically in the opposite direction of said plane, wherein portions of a pair of secondary wings are provided in said craft, while one wing of said pair of secondary wings extends laterally of said medial plane and the other wing of said secondary wings extends from said body symmetrically in the opposite direction of said plane, wherein each wing portion of said secondary pair of wing portions is provided with a secondary propeller which is revolvably borne and located on the front of the respective portion of said secondary wing portions and thereby also located rearwardly behind the respective portion of said pair of first wing portions, whereby the propeller of said one wing and the propeller of said other wing of said secondary wings form together a pair of secondary wing propellers, wherein variation means are attached to said secondary wings;

wherein said secondary wing pair includes flexibility arrangements to permit a change of the location or direction of said wings of said secondary pair, wherein said secondary wings are variable in their position relative to said first wing pair in order to obtain suitable flight conditions of said craft at different speeds of forward movement of said craft, wherein said secondary wings are located at least partially rearwardly behind said pair of first wing portions and at least temporarily inside of the airflow stream over said pair of first wing portions, while said flexibility arrangements are provided to vary the characteristic and performance of flow of air over said first wing portions and over said pair of secondary wings, whereby the ability and attitude of said aircraft is at least partially controlled by said flexibility arrangements and said pair of secondary wings, wherein said first wing portions are permanently fixed to the body of said craft in fixed angles of chord relative to said body, whereby said angles of chord of said first wing portions are not variable and remain at all times permanently fixed, wherein said portions of said second wings are pivotable around centers for a pivotal movement with said centers defining pivot axes which are substantially laterally extended from said body and which are substantially parallel to the extension of said first wing portions, and, wherein said pivot axes are located substantially along the rear portions of said first wing portions and thereby substantially along the front portions of said secondary wings, whereby the pivotal movements of said secondary wings around said pivot axes actuate and define an inclination of said secondary wings relative to said first wing portions.

2. The craft of claim 1, wherein said secondary propellers create an air-flow over portions of said secondary wings while at same time they suck an air-flow over portions of said first wing portions, whereby said propellers are creating at least partially and temporarily an air-flow over said first wing portions and said portions of said secondary wings.

3. The craft of claim 2, wherein said secondary wings are provided with a transfer means to transfer said pivot axes and said portions of said secondary wings forward and rearward respectively to said body and to said pair of first wing portions.

4. The craft of claim 3, wherein the respective portion of said first wing portions is provided on its rear end with a storage compartment for the reception of a propeller and the propeller of the respective portion of said secondary wings is set into said compartment, when said secondary wings are moved forward towards said first wing portion while said propeller is set to rest.

5. The craft of claim 1, wherein said pivot axes of said secondary wings are located behind and below the respective chords of said first wing portions.

6. An aircraft having a body with a longitudinal imaginary vertical medial plane through said body and a pair of first wing portions extending laterally from said body, one wing of said pair in one lateral direction of said plane and the other wing of said pair extending symmetrically in the opposite direction of said plane, wherein said wings of said pair include fluid lines to a pair of fluid motors which revolve propellers which are fastened to the rotors of said motors, wherein portions of a pair of secondary wings are provided in said craft, while one wing of said pair of secondary wings extends laterally of said medial plane and the other wing of said secondary wings extends from said body symmetrically in the opposite direction of said plane, wherein each wing portion of said secondary pair of wing portions is provided with a secondary propeller which is revolvably borne and located on the front of the respective portion of said secondary wing portions and thereby also located rearwardly behind the respective portion of said pair of first wing portions, whereby the propeller of said one wing and the propeller of said other wing of said secondary wings form together a pair of secondary wing propellers, wherein said secondary wings are located at least partially rearwardly behind said pair of first wing portions and at least temporarily inside of the airflow stream over said pair of first wing portions, while flexibility arrangements are provided to vary the characteristic and performance of flow of air over said first wing portions and over said pair of secondary wings, whereby the ability and attitude of said aircraft is at least partially controlled by said flexibility arrangements and said pair of secondary wings, wherein said secondary pair of wings includes fluid lines to secondary fluid motors to revolve said secondary propellers, while said secondary propellers are fastened to the rotors of the motors of said secondary wing pair, whereby the fluid streams created by the revolutions of said secondary propellers are forced to flow substantially parallel to the axis of said secondary propellers and thereby along respective portions of the skins of said secondary wings, wherein flexible means are included in said fluid lines, wherein said secondary wing pair includes flexibility arrangements to permit a change of the location or direction of said wings of said secondary pair, wherein said secondary wings are variable in their position relatively to said first wing pair in order to obtain suitable flight conditions of said craft at different speeds of forward movement of said craft, wherein said first wing portions are permanently fixed to the body of said craft in fixed angles of chord relatively to said body, whereby said angles of chord of said first wing portions are not variable and remain at all times permanently fixed, wherein said portions of said secondary wings are pivotable around centers of pivotal movements with said centers defining pivot axes which are substantially laterally extended from said body and which are substantially parallel to the extension of said first wing portions, and, wherein said pivot axes are located substantially along the rear portions of said first wing portions and thereby substantially along the front portions of said secondary wings, the pivotal movements of said secondary wings around said pivot axes actuate and define an inclination of said secondary wings relatively to said first wing portions.

7. The craft of claim 6,
wherein said secondary propellers create an air-flow over portions of said secondary wings while at same time they suck an air-flow over portions of said first wing portions, whereby said propellers are creating at least partially and temporarily an air-flow over said first wing portions and said portions of said secondary wings.
8. The craft of claim 7,
wherein said secondary wings are provided with a transfer means to transfer said pivot axes and said portions of said secondary wings forward and rearward respective to said body and to said pair of first wing portions.

9. The craft of claim 8,
wherein the respective portion of said first wing portions is provided on its rear end with a storage compartment for the reception of a propeller and the propeller of the respective portion of said secondary wings is set into said compartment, when said secondary wings are moved forward towards said first wing portion while said propeller is set to rest.
10. The craft of claim 6,
wherein said pivot axes of said secondary wings are located behind and below the respective chords of said first wing portions.

* * * * *